United States Patent
Kanunikov et al.

(10) Patent No.: US 12,319,521 B2
(45) Date of Patent: Jun. 3, 2025

(54) SYSTEM AND METHOD FOR ROBOTIC OBJECT PLACEMENT

(71) Applicant: MUJIN, INC., Tokyo (JP)

(72) Inventors: Denys Kanunikov, Tokyo (JP); Ziyan Zhou, Tokyo (JP); Xutao Ye, Tokyo (JP); Rosen Nikolaev Diankov, Tokyo (JP)

(73) Assignee: MUJIN, INC., Tokyo (JP)

( * ) Notice: Subject to any disclaimer, the term of this patent is extended or adjusted under 35 U.S.C. 154(b) by 311 days.

(21) Appl. No.: 17/884,209

(22) Filed: Aug. 9, 2022

(65) Prior Publication Data
US 2023/0052515 A1 Feb. 16, 2023

Related U.S. Application Data

(60) Provisional application No. 63/231,326, filed on Aug. 10, 2021.

(51) Int. Cl.
*B25J 9/16* (2006.01)
*B25J 19/02* (2006.01)
(Continued)

(52) U.S. Cl.
CPC ............ *B65G 61/00* (2013.01); *B25J 9/1664* (2013.01); *B25J 19/023* (2013.01); *G06T 7/73* (2017.01);
(Continued)

(58) Field of Classification Search
None
See application file for complete search history.

(56) References Cited

U.S. PATENT DOCUMENTS 10,525,599 B1 * 1/2020 Zutshi .................... B25J 9/1697
10,696,494 B1 6/2020 Diankov et al.
(Continued)

FOREIGN PATENT DOCUMENTS

JP 2013-086914 A 5/2013
JP 2020-196118 A 12/2020
(Continued)

OTHER PUBLICATIONS

Notice of Reasons for Rejection issued Dec. 22, 2022 in JP Appl. No. 2022-127481.
(Continued)

*Primary Examiner* — Kidest Bahta
(74) *Attorney, Agent, or Firm* — MEDLER FERRO WOODHOUSE & MILLS PLLC

(57) ABSTRACT

A computing system including a processing circuit in communication with a robot and a camera having a field of view. The processing circuit obtains image information based on the objects in the field of view and a loading environment, the loading environment which includes loading areas, an object queue, and a buffer zone. The computing system is configured to use the obtained image information in motion planning operations for the retrieval and placement of objects from the object queue into the loading environment. Pallets provided within the loading environment (i.e., within the loading areas) are dedicated to receiving objects having corresponding object type identifiers. The computer system further uses the image information to determine the fill status of pallets existing within the loading environment, and whether new pallets need to be brought into the loading environment and/or swapped out with existing pallets to account for future planning and placement operations.

21 Claims, 21 Drawing Sheets

(51) Int. Cl.
  *B65G 61/00*    (2006.01)
  *G06T 7/73*     (2017.01)
  *G06V 20/50*    (2022.01)
(52) U.S. Cl.
  CPC .... *G06V 20/50* (2022.01); *G05B 2219/39001* (2013.01); *G06V 2201/06* (2022.01)

(56) References Cited

U.S. PATENT DOCUMENTS

| | | |
|---|---|---|
| 10,800,608 B1 | 10/2020 | Campbell et al. |
| 10,953,544 B2 | 3/2021 | Diankov et al. |
| 11,472,640 B2 | 10/2022 | Diankov et al. |
| 11,488,323 B2 | 11/2022 | Diankov et al. |
| 2014/0163736 A1* | 6/2014 | Azizian .................. A61B 34/20 700/259 |
| 2018/0361589 A1* | 12/2018 | Paquin ................... B25J 9/1697 |
| 2020/0023521 A1* | 1/2020 | Dan ........................ B25J 9/1692 |
| 2020/0377312 A1* | 12/2020 | Diankov ................ B65G 57/00 |
| 2022/0355474 A1 | 11/2022 | Ye et al. |

FOREIGN PATENT DOCUMENTS

| | | |
|---|---|---|
| JP | 2020-196611 A | 12/2020 |
| JP | 2020-196612 A | 12/2020 |
| JP | 2021-508605 A | 3/2021 |
| JP | 2022-172465 A | 11/2022 |

OTHER PUBLICATIONS

Decision to Grant issued Feb. 1, 2023 in JP Appl. No. 2022-127481.

\* cited by examiner

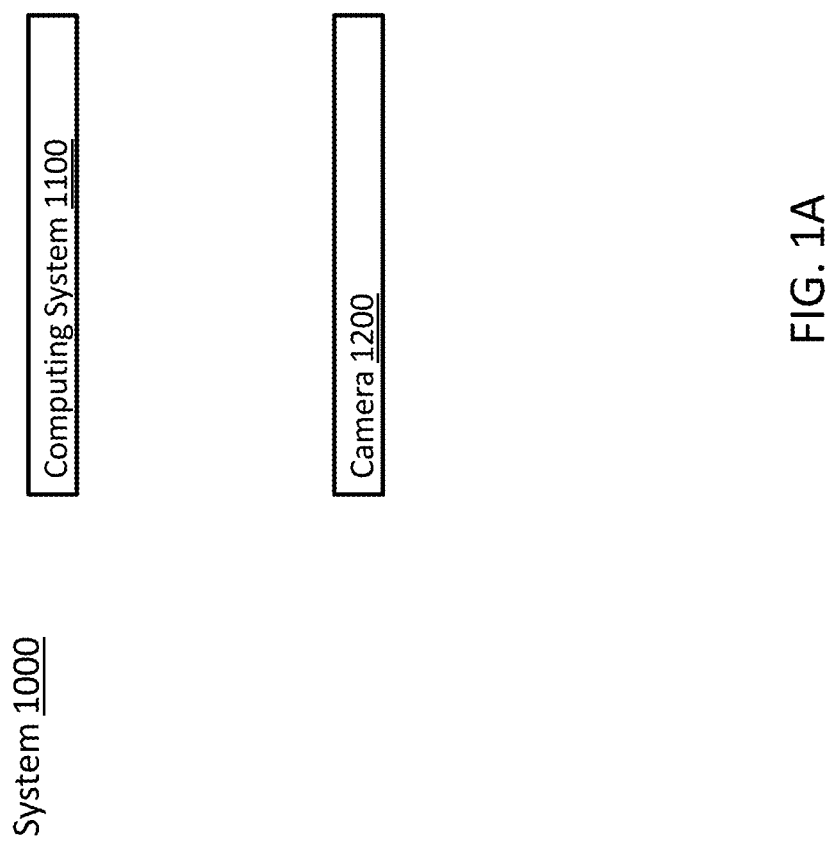

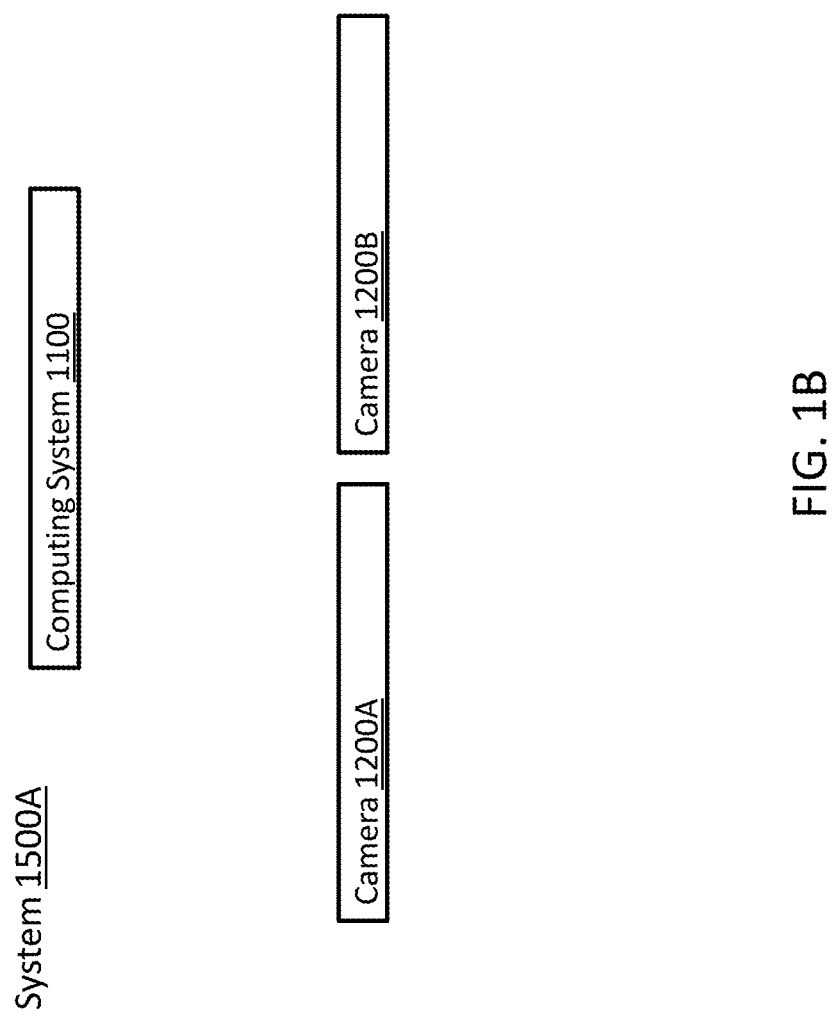

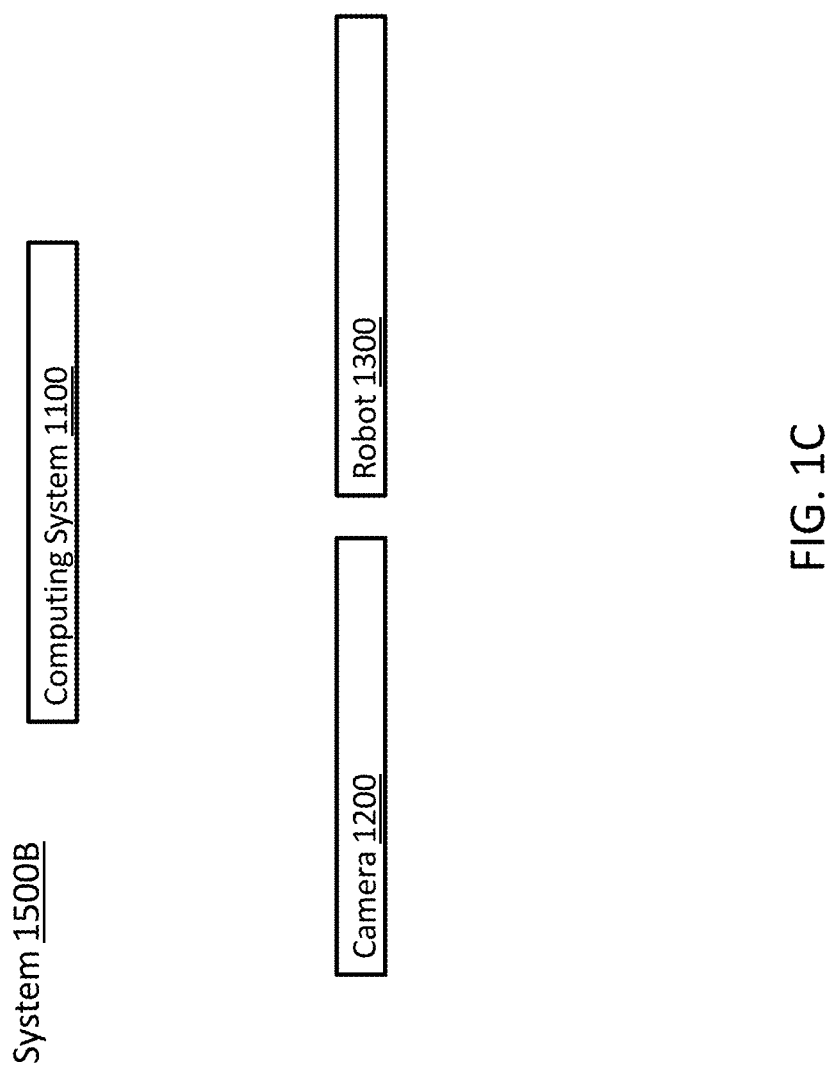

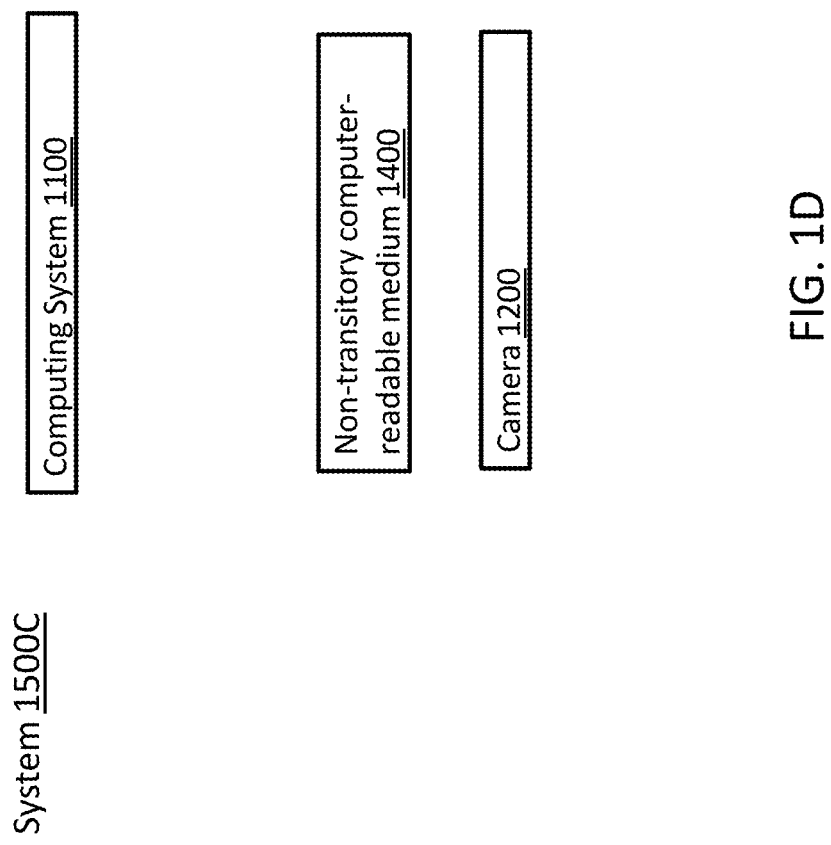

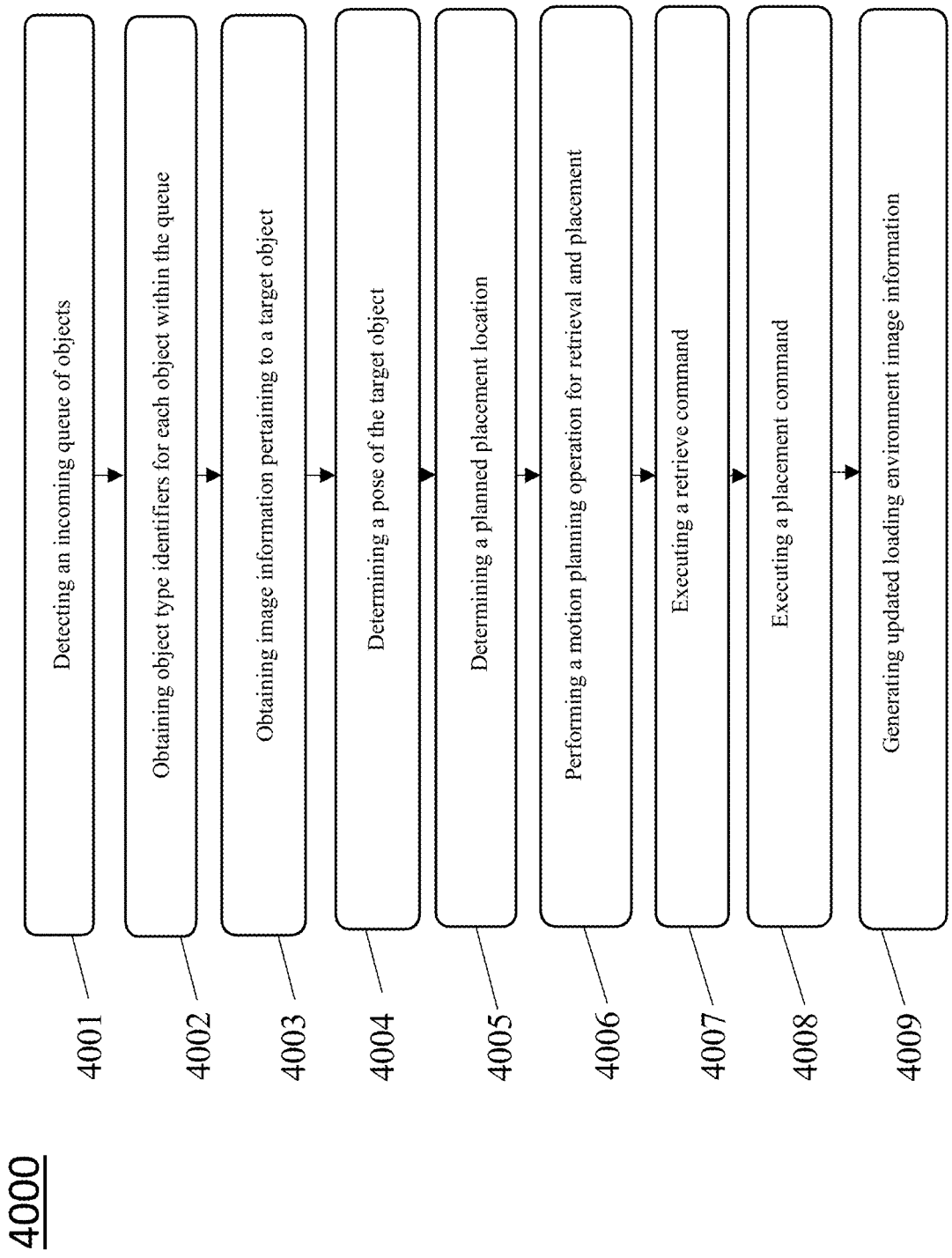

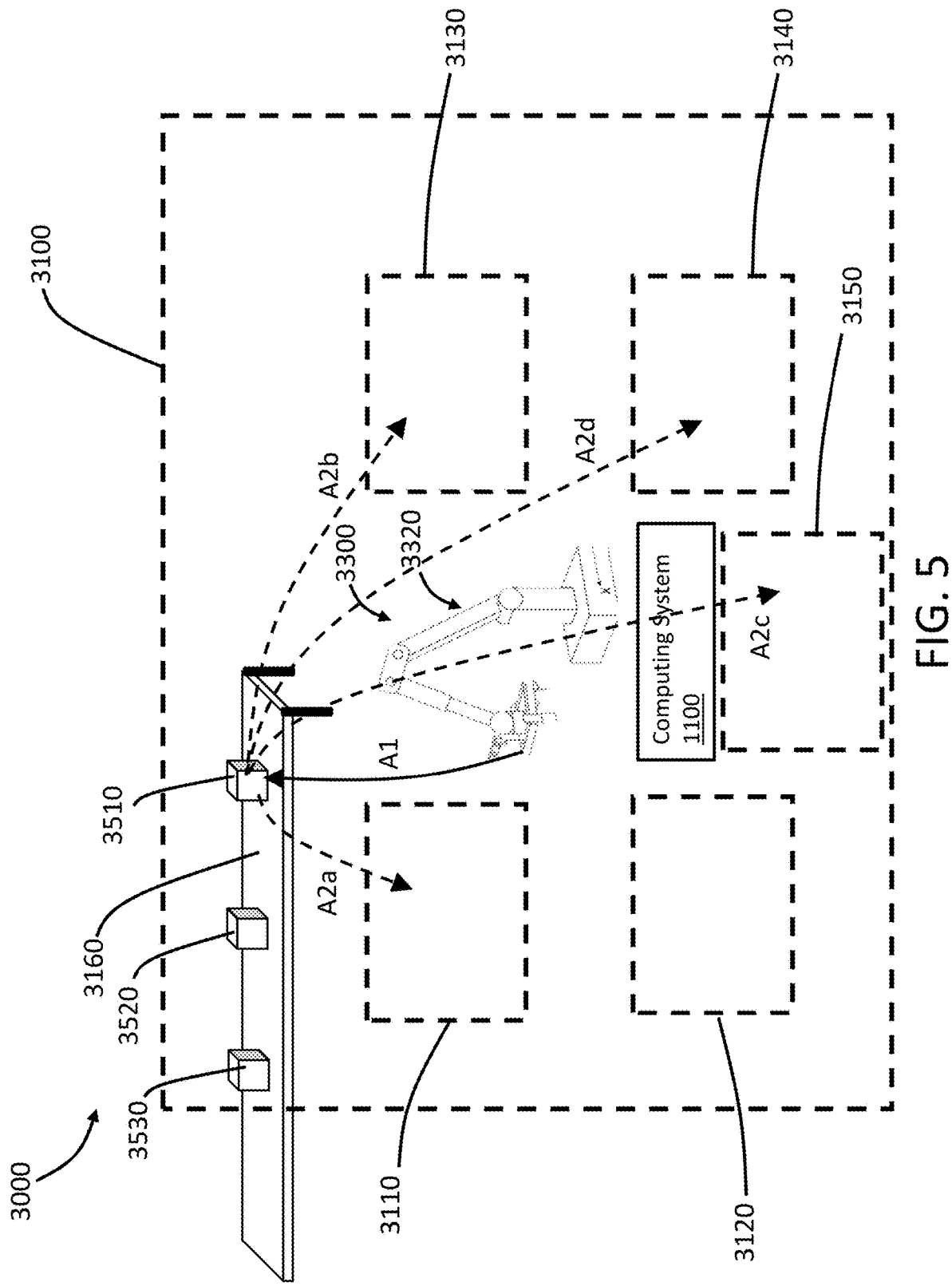

SYSTEM AND METHOD FOR ROBOTIC OBJECT PLACEMENT

CROSS-REFERENCE TO RELATED APPLICATION(S)

The present application claims the benefit of U.S. Provisional Appl. No. 63/231,326, entitled "A ROBOTIC SYSTEM FOR PLANNING OR FACILITATING OBJECT PICKING" and filed Aug. 10, 2021, the entire content of which is incorporated by reference herein.

FIELD OF THE INVENTION

The present technology is directed generally to robotic systems and, more specifically, to systems, processes, and techniques for determining and facilitating the picking and placement of objects in an environment around a robot.

BACKGROUND

With their ever-increasing performance and lowering cost, many robots (e.g., machines configured to automatically/autonomously execute physical actions) are now extensively used in various different fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human interactions required for executing larger and/or more complex tasks. Accordingly, there remains a need for improved techniques and systems for managing operations and/or interactions between robots.

BRIEF SUMMARY

In an embodiment, a computing system is provided. The computing system includes a control system configured to communicate with a robot having a robot arm that includes or is attached to an end effector apparatus, and having a camera attached to the robot arm. At least one processing circuit is configured, when the robot is in a loading environment and a queue of objects for placement in the loading environment is provided, to perform the following steps for transferring the objects from the queue of objects into the loading environment. The steps include detecting the queue of objects to be provided to the loading environment; receiving a plurality of object type identifiers, each of the plurality of object type identifiers being associated with a respective object of the objects from the queue; determining a target object pose of a target object in the queue based on object queue image information received from the camera; determining a target object placement for the target object indicating a planned placement location of the target object in the loading environment; performing a motion planning operation for retrieval and placement of the target object according to the target object pose generated from the object queue image information, and the target object planned placement location; executing a placement command for placing the target object in the loading environment according to the motion planning operation; and generating loading environment image information including a target object placement pose in the loading environment.

In another embodiment, a computing system is provided. The computing system includes a control system configured to communicate with a robot having a robot arm that includes or is attached to an end effector apparatus, and having a camera attached to the robot arm. At least one processing circuit is configured, when the robot is in a loading environment that includes a plurality of loading areas, a buffer zone, existing objects, and a queue of incoming objects, to perform the following steps. The steps include: processing loading environment image information received from the camera; identifying a loading environment state from the processed loading environment image information, the loading environment state including a plurality of existing object type identifiers associated with respective existing objects and a plurality of incoming object type identifiers associated with respective incoming objects; executing a pallet detection operation to: detect an existing pallet in the loading environment from the loading environment image information, determine a pallet fill status of the existing pallet, and identify a pallet identifier associated with the existing pallet; and determining an object moving command to be performed based on a comparison between the plurality of existing object type identifiers, the plurality of incoming object type identifiers, and the pallet identifier.

In another embodiment, a robotic control method configured to be performed by a control system configured to communicate with a robot is provided. The robot includes a robot arm that includes or is attached to an end effector apparatus. A camera is attached to the robot arm when the robot is in a loading environment and a queue of objects for placement in the loading environment is provided. The method comprises detecting the queue of objects to be provided to the loading environment; receiving a plurality of object type identifiers, each of the plurality of object type identifiers being associated with a respective object of the objects from queue; determining a target object pose of a target object in the queue based on object queue image information received from the camera; determining a target object placement for the target object indicating a planned placement location of the target object in the loading environment; performing a motion planning operation for retrieval and placement of the target object according to the target object pose generated from the object queue image information, and the planned placement location; executing a retrieve command for retrieving the target object from the queue according to the motion planning operation; executing a placement command for placing the target object in the loading environment according to the motion planning operation; and generating updated loading environment image information including a target object placement pose in the loading environment.

In another embodiment, a robotic control method is configured to be performed by a control system configured to communicate with a robot. The robot includes a robot arm that includes or is attached to an end effector apparatus. A camera is attached to the robot arm when the robot is in a loading environment and a queue of objects for placement in the loading environment is provided. The method comprises processing loading environment image information received from the camera; identifying a loading environment state from the processed loading environment image information, the loading environment state including a plurality of existing object type identifiers associated with respective existing objects and a plurality of incoming object type identifiers associated with respective incoming objects; executing a pallet detection operation to: detect an existing pallet in the loading environment from the loading environment image information, determine a pallet fill status of the existing pallet, and identify a pallet identifier associated with the existing pallet; and determining an object moving command to be performed based on a comparison between the plurality of existing object type identifiers, the plurality of incoming object type identifiers, and the pallet identifier.

BRIEF DESCRIPTION OF THE FIGURES

FIG. 1A illustrates a system for performing or facilitating the planning and placement of objects within a loading environment according to embodiments hereof.

FIG. 1B illustrates an embodiment of the system for performing or facilitating the planning and placement of objects within a loading environment according to embodiments hereof.

FIG. 1C illustrates another embodiment of the system for performing or facilitating the planning and placement of objects within a loading environment according to embodiments hereof.

FIG. 1D illustrates yet another embodiment of the system for performing or facilitating the planning and placement of objects within a loading environment according to embodiments hereof.

FIG. 4 provides a flow diagram that illustrates a method of planning and placement of objects within a loading environment according to an embodiment hereof.

FIG. 5 depicts an object loading environment consistent with embodiments hereof.

DETAILED DESCRIPTION

Figure 2A:
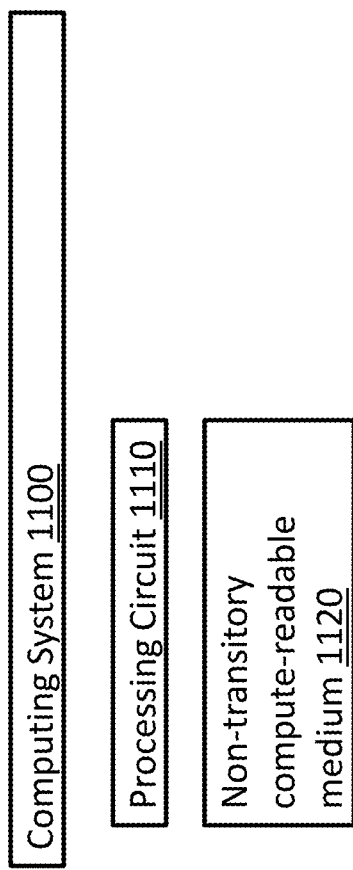
FIG. 2A is a block diagram that illustrates a computing system configured to perform or facilitate the planning and placement of objects within a loading environment, consistent with embodiments hereof.

Systems and methods for a robotic system with a coordinated transfer mechanism are described herein. Robotic systems (e.g., an integrated system of devices that each execute one or more designated tasks) configured in accordance with embodiments hereof may autonomously execute integrated tasks by coordinating operations of multiple units (e.g., robots). Robotic systems, as described herein, may include any suitable combination of robotic devices, sensors, and computing systems configured to control, issue commands to, and receive information from such robotic devices and sensors.

The technology described herein provides technical improvements to a robotic system configured for use in a loading environment. Technical improvements described herein increase the speed and precision of planning for and executing the retrieval and placement of objects within a loading environment. The robotic system further provides improvements to the efficiency of palletization or de-palletization operations conducted within and adjacent to the loading environment.

The present application refers to systems and robotic systems. Robotic systems, as discussed herein, may include robotic actuator components (e.g., robotic arms, robotic grippers, etc.), various sensors (e.g., cameras, etc.), and various computing or control systems. As discussed herein, computing systems or control systems may be referred to as "controlling" various robotic components, such as robotic arms, robotic grippers, cameras, etc. Such "control" may refer to direct control of and interaction with the various actuators, sensors, and other functional aspects of the robotic components. For example, a computing system may control a robotic arm by issuing or providing all of the required signals to cause the various motors, actuators, and sensors to cause robotic movement. Such "control" may also refer to the issuance of abstract or indirect commands to a further robotic control system that then translates such commands into the necessary signals for causing robotic movement. For example, a computing system may control a robotic arm by issuing a command describing a trajectory or destination location to which the robotic arm should move to and a further robotic control system associated with the robotic arm may receive and interpret such a command and then provide the necessary direct signals to the various actuators and sensors of the robotic arm to cause the required movement.

In particular, the present technology described herein assists a robotic system to interact with a target object among a plurality of objects, wherein the object targeted for retrieval and placement within the loading environment is dependent upon a variety of factors, including but not limited to: object type identifiers, fill statuses of various loading areas/zones within the loading environment, and pallet correspondence. For example, if an incoming target object, e.g., a target object newly arrived to the loading environment, possesses an object type identifier that corresponds to a pallet (i.e. the pallet is designated to receive objects with the object type identifier of the incoming target object) existing within the loading environment, then the robotic system may control the robot to retrieve that incoming target object and place it on the pallet. If an existing object (i.e. an object available in a buffer zone within the loading environment) possesses an object type identifier corresponding to that pallet, the robotic system may further control the robot to retrieve the existing object and place it on the pallet. In further embodiments, systems consistent with the present disclosure may be configured to exchange pallets into and out of a loading area or zone responsive to the presence of specific types of existing and incoming objects.

In the following, specific details are set forth to provide an understanding of the presently disclosed technology. In embodiments, the techniques introduced here may be practiced without including each specific detail disclosed herein. In other instances, well-known features, such as specific functions or routines, are not described in detail to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments may have different configurations or different components than those described in this section. Accordingly, the disclosed techniques may have other embodiments with additional elements or without several of the elements described below.

Many embodiments or aspects of the present disclosure described below may take the form of computer- or controller-executable instructions, including routines executed by a programmable computer or controller. Those skilled in the relevant art will appreciate that the disclosed techniques can be practiced on or with computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palmtop computers, wearable computers, cellular or mobile phones, multi-processor systems, processor-based or programmable consumer electronics, network computers, minicomputers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Any reference herein to image analysis by a computing system may be performed according to or using spatial structure information that may include depth information which describes respective depth value of various locations relative a chosen point. The depth information may be used to identify objects or estimate how objects are spatially arranged. In some instances, the spatial structure information may include or may be used to generate a point cloud that describes locations of one or more surfaces of an object. Spatial structure information is merely one form of possible image analysis and other forms known by one skilled in the art may be used in accordance with the methods described herein.

FIG. 1A illustrates a system 1000 for performing object detection, or, more specifically, object recognition. More particularly, the system 1000 may include a computing system 1100 and a camera 1200. In this example, the camera 1200 may be configured to generate image information which describes or otherwise represents an environment in which the camera 1200 is located, or, more specifically, represents an environment in the camera's 1200 field of view (also referred to as a camera field of view). The environment may be, e.g., a warehouse, a manufacturing plant, a retail space, or other premises. In such instances, the image information may represent objects located at such premises, such as boxes, bins, cases, crates, pallets, or other containers. The system 1000 may be configured to generate, receive, and/or process the image information, such as by using the image information to distinguish between individual objects in the camera field of view, to perform object recognition or object registration based on the image information, and/or perform robot interaction planning based on the image information, as discussed below in more detail (the terms "and/or" and "or" are used interchangeably in this disclosure). The robot interaction planning may be used to, e.g., control a robot at the premises to facilitate robot interaction between the robot and the containers or other objects. The computing system 1100 and the camera 1200 may be located at the same premises or may be located remotely from each other. For instance, the computing system 1100 may be part of a cloud computing platform hosted in a data center which is remote from the warehouse or retail space and may be communicating with the camera 1200 via a network connection.

In an embodiment, the camera 1200 (which may also be referred to as an image sensing device) may be a 2D camera and/or a 3D camera. For example, FIG. 1B illustrates a system 1500A (which may be an embodiment of the system 1000) that includes the computing system 1100 as well as a camera 1200A and a camera 1200B, both of which may be an embodiment of the camera 1200. In this example, the camera 1200A may be a 2D camera that is configured to generate 2D image information which includes or forms a 2D image that describes a visual appearance of the environment in the camera's field of view. The camera 1200B may be a 3D camera (also referred to as a spatial structure sensing camera or spatial structure sensing device) that is configured to generate 3D image information which includes or forms spatial structure information regarding an environment in the camera's field of view. The spatial structure information may include depth information (e.g., a depth map) which describes respective depth values of various locations relative to the camera 1200B, such as locations on surfaces of various objects in the camera 1200B's field of view. These locations in the camera's field of view or on an object's surface may also be referred to as physical locations. The depth information in this example may be used to estimate how the objects are spatially arranged in three-dimensional (3D) space. In some instances, the spatial structure information may include or may be used to generate a point cloud that describes locations on one or more surfaces of an object in the camera 1200B's field of view. More specifically, the spatial structure information may describe various locations on a structure of the object (also referred to as an object structure).

In an embodiment, the system 1000 may be a robot operation system for facilitating robot interaction between a robot and various objects in the environment of the camera 1200. For example, FIG. 1C illustrates a robot operation system 1500B, which may be an embodiment of the system 1000/1500A of FIGS. 1A and 1B. The robot operation system 1500B may include the computing system 1100, the camera 1200, and a robot 1300. As stated above, the robot 1300 may be used to interact with one or more objects in the environment of the camera 1200, such as with boxes, crates, bins, pallets, or other containers. For example, the robot 1300 may be configured to pick up the containers from one location and move them to another location. In some cases, the robot 1300 may be used to perform a de-palletization operation in which a group of containers or other objects are unloaded and moved to, e.g., a conveyor belt. In some implementations, the camera 1200 may be attached to the robot 1300 or the robot 3300, discussed below. This is also known as a camera in-hand or a camera on-hand solution. The camera 1200 may be attached to a robot arm 3320 of the robot 1300. The robot arm 3320 may then move to various picking regions (such as the queue 3160, the loading areas 3110/3120/3130/3140 or the buffer zone 3150) to generate image information regarding those regions. In some implementations, the camera 1200 may be separate from the robot 1300. For instance, the camera 1200 may be mounted to a ceiling of a warehouse or other structure and may remain stationary relative to the structure. In some implementations, multiple cameras 1200 may be used, including multiple cameras 1200 separate from the robot 1300 and/or cameras 1200 separate from the robot 1300 being used in conjunction with in-hand cameras 1200. In some implementations, a camera 1200 or cameras 1200 may be mounted or affixed to a dedicated robotic system separate from the robot 1300 used for object manipulation, such as a robotic arm, gantry, or other automated system configured for camera movement. Throughout the specification, "control" or "controlling" the camera 1200 may be discussed. For camera in-hand solutions, control of the camera 1200 also includes control of the robot 1300 to which the camera 1200 is mounted or attached.

In an embodiment, the computing system 1100 of FIGS. 1A-1C may form or be integrated into the robot 1300, which may also be referred to as a robot controller. A robot control system may be included in the system 1500B, and is configured to e.g., generate commands for the robot 1300, such as a robot interaction movement command for controlling robot interaction between the robot 1300 and a container or other object. In such an embodiment, the computing system 1100 may be configured to generate such commands based on, e.g., image information generated by the camera 1200. For instance, the computing system 1100 may be configured to determine a motion plan based on the image information, wherein the motion plan may be intended for, e.g., gripping or otherwise picking up an object. The computing system 1100 may generate one or more robot interaction movement commands to execute the motion plan.

In an embodiment, the computing system 1100 may form or be part of a vision system. The vision system may be a system which generates, e.g., vision information which describes an environment in which the robot 1300 is located, or, alternatively or in addition to, describes an environment in which the camera 1200 is located. The vision information may include the 3D image information and/or the 2D image information discussed above, or some other image information. In some scenarios, if the computing system 1100 forms a vision system, the vision system may be part of the robot control system discussed above or may be separate from the robot control system. If the vision system is separate from the robot control system, the vision system may be configured to output information describing the environment in which the robot 1300 is located. The information may be outputted to the robot control system, which may receive such information from the vision system and performs motion planning and/or generates robot interaction movement commands based on the information. Further information regarding the vision system is detailed below.

In an embodiment, the computing system 1100 may communicate with the camera 1200 and/or with the robot 1300 via a direct connection, such as a connection provided via a dedicated wired communication interface, such as a RS-232 interface, a universal serial bus (USB) interface, and/or via a local computer bus, such as a peripheral component interconnect (PCI) bus. In an embodiment, the computing system 1100 may communicate with the camera 1200 and/or with the robot 1300 via a network. The network may be any type and/or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the computing system 1100 may communicate information directly with the camera 1200 and/or with the robot 1300, or may communicate via an intermediate storage device, or more generally an intermediate non-transitory computer-readable medium. For example, FIG. 1D illustrates a system 1500C, which may be an embodiment of the system 1000/1500A/1500B, that includes a non-transitory computer-readable medium 1400, which may be external to the computing system 1100, and may act as an external buffer or repository for storing, e.g., image information generated by the camera 1200. In such an example, the computing system 1100 may retrieve or otherwise receive the image information from the non-transitory computer-readable medium 1400. Examples of the non-transitory computer readable medium 1400 include an electronic storage device, a magnetic storage device, an optical storage device, an electromagnetic storage device, a semiconductor storage device, or any suitable combination thereof. The non-transitory computer-readable medium may form, e.g., a computer diskette, a hard disk drive (HDD), a solid-state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and/or a memory stick.

As stated above, the camera 1200 may be a 3D camera and/or a 2D camera. The 2D camera may be configured to generate a 2D image, such as a color image or a grayscale image. The 3D camera may be, e.g., a depth-sensing camera, such as a time-of-flight (TOF) camera or a structured light camera, or any other type of 3D camera. In some cases, the 2D camera and/or 3D camera may include an image sensor, such as a charge coupled devices (CCDs) sensor and/or complementary metal oxide semiconductors (CMOS) sensor. In an embodiment, the 3D camera may include lasers, a LIDAR device, an infrared device, a light/dark sensor, a motion sensor, a microwave detector, an ultrasonic detector, a RADAR detector, or any other device configured to capture depth information or other spatial structure information.

As stated above, the image information may be processed by the computing system 1100. In an embodiment, the computing system 1100 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 1100 may be performed as part of a cloud computing platform. The computing system 1100 may be a single computing device (e.g., a desktop computer), or may include multiple computing devices.

FIG. 2A provides a block diagram that illustrates an embodiment of the computing system 1100. The computing system 1100 in this embodiment includes at least one processing circuit 1110 and a non-transitory computer-readable medium (or media) 1120. In some instances, the processing circuit 1110 may include processors (e.g., central processing units (CPUs), special-purpose computers, and/or onboard servers) configured to execute instructions (e.g., software instructions) stored on the non-transitory computer-readable medium 1120 (e.g., computer memory). In some embodiments, the processors may be included in a separate/stand-alone controller that is operably coupled to the other electronic/electrical devices. The processors may implement the program instructions to control/interface with other devices, thereby causing the computing system 1100 to execute actions, tasks, and/or operations. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit.

In an embodiment, the non-transitory computer-readable medium 1120, which is part of the computing system 1100, may be an alternative or addition to the intermediate non-transitory computer-readable medium 1400 discussed above. The non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. In certain implementations, the non-transitory computer-readable medium 1120 is configured to store image information generated by the camera 1200 and received by the computing system 1100. In some instances, the non-transitory computer-readable medium 1120 may store one or more model templates used for performing an object recognition operation. The non-transitory computer-readable medium 1120 may alternatively or additionally store computer readable program instructions that, when executed by the processing circuit 1110, causes the processing circuit 1110 to perform one or more methodologies described here.

Figure 2B:
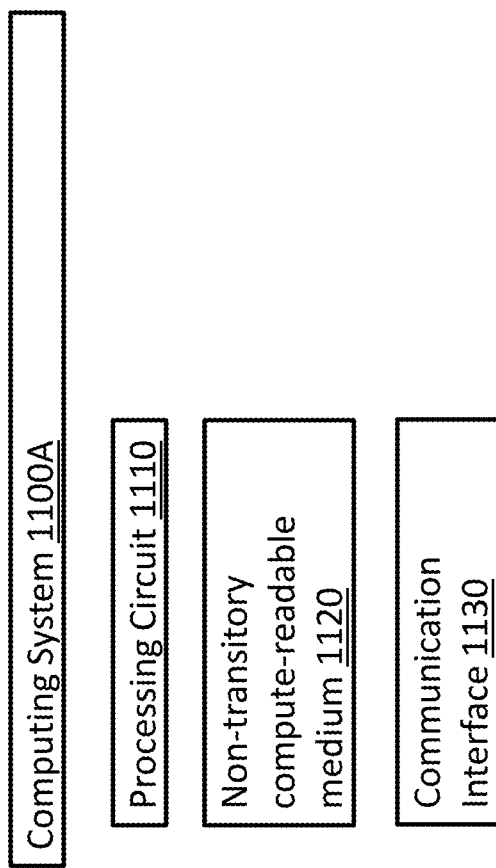
FIG. 2B is a block diagram that illustrates an embodiment of a computing system configured to perform or facilitate the planning and placement of objects within a loading environment, consistent with embodiments hereof.

FIG. 2B depicts a computing system 1100A that is an embodiment of the computing system 1100 and includes a communication interface 1130. The communication interface 1130 may be configured to, e.g., receive image information generated by the camera 1200 of FIGS. 1A-1D. The image information may be received via the intermediate non-transitory computer-readable medium 1400 or the network discussed above, or via a more direct connection between the camera 1200 and the computing system 1100/1100A. In an embodiment, the communication interface 1130 may be configured to communicate with the robot 1300 of FIG. 1C. If the computing system 1100 is external to a robot control system, the communication interface 1130 of the computing system 1100 may be configured to communicate with the robot control system. The communication interface 1130 may also be referred to as a communication component or communication circuit, and may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
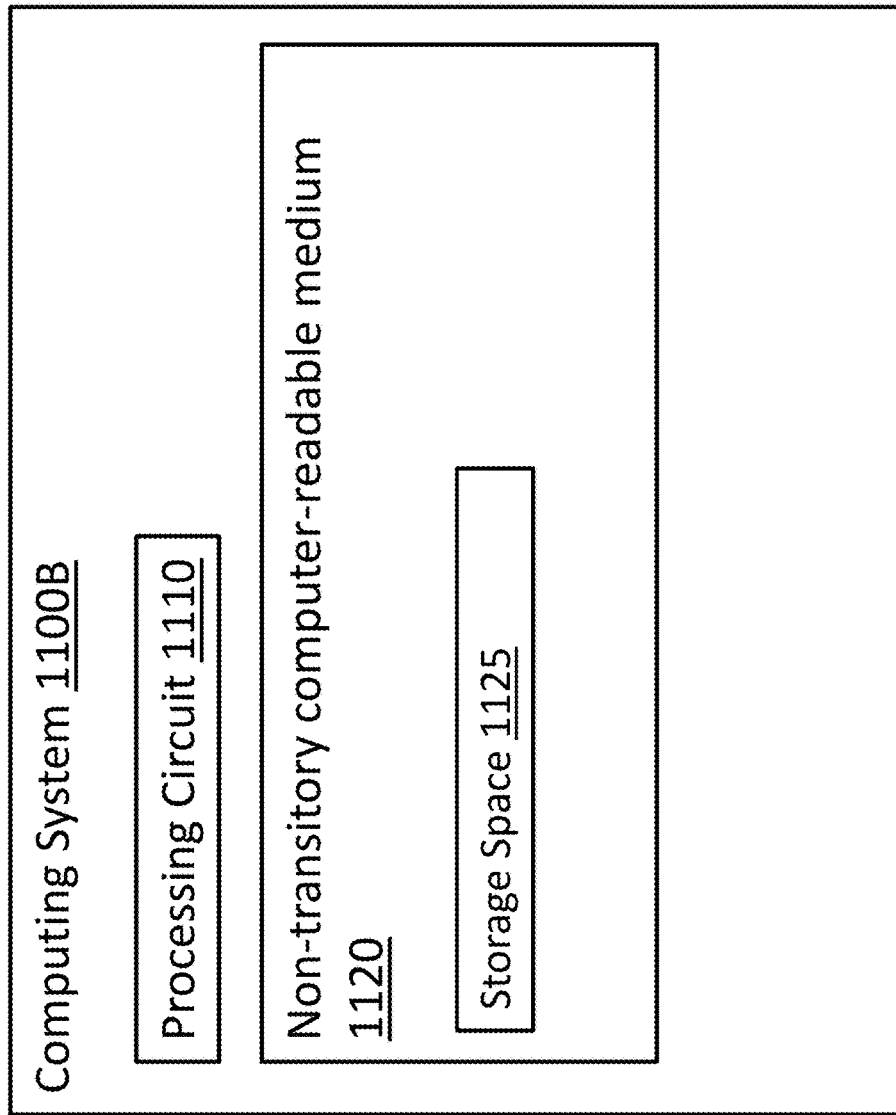
FIG. 2C is a block diagram that illustrates another embodiment of a computing system configured to perform or facilitate the planning and placement of objects within a loading environment, consistent with embodiments hereof.

In an embodiment, as depicted in FIG. 2C, the non-transitory computer-readable medium 1120 may include a storage space 1125 configured to store one or more data objects discussed herein. For example, the storage space may store model templates, robotic arm move commands, and any additional data objects the computing system 1100B may require access to.

Figure 2D:
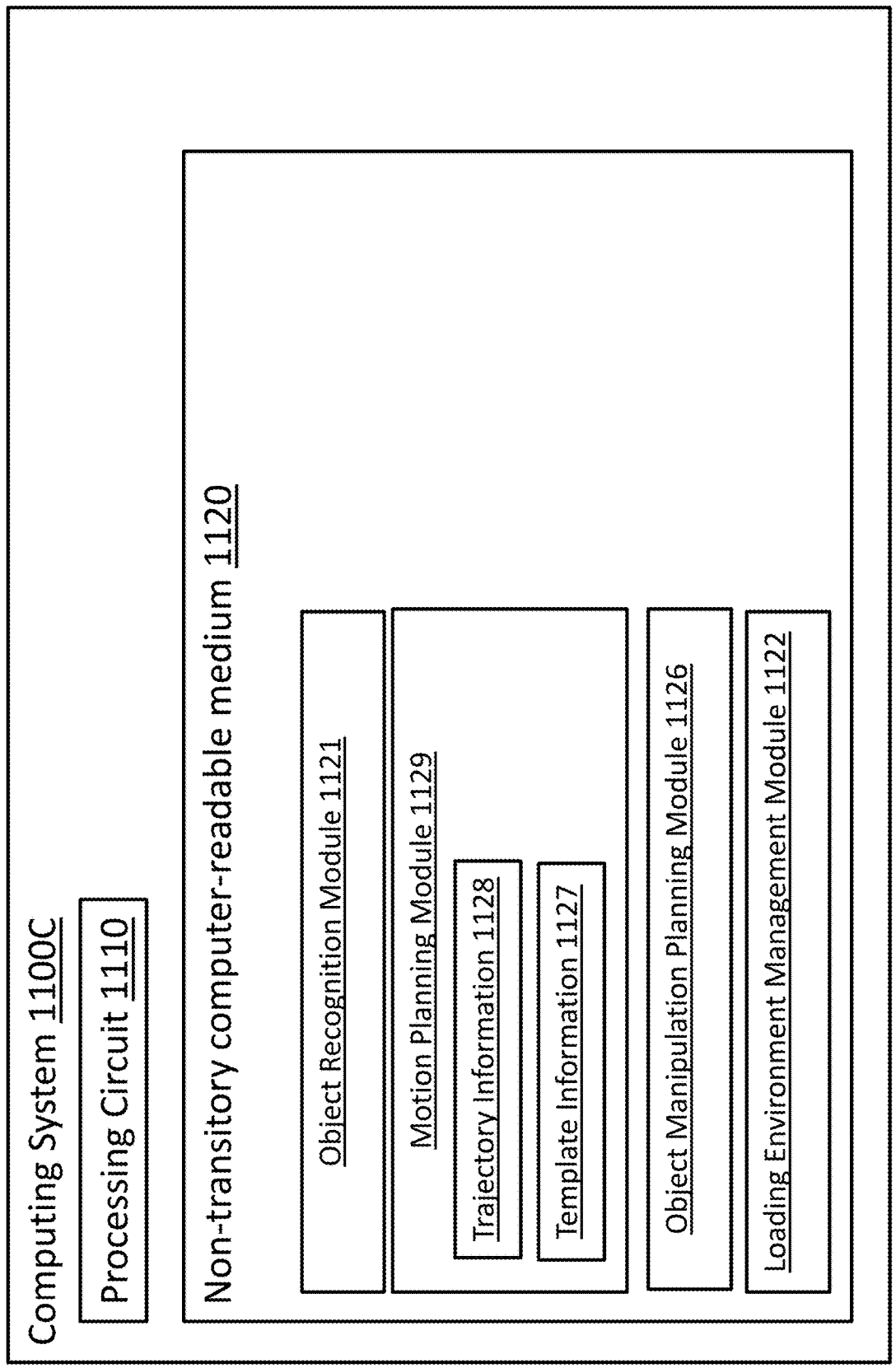
FIG. 2D is a block diagram that illustrates yet another embodiment of a computing system configured to perform or facilitate the planning and placement of objects within a loading environment, consistent with embodiments hereof.

In an embodiment, the processing circuit 1110 may be programmed by one or more computer-readable program instructions stored on the non-transitory computer-readable medium 1120. For example, FIG. 2D illustrates a computing system 1100C, which is an embodiment of the computing system 1100/1100A/1100B, in which the processing circuit 1110 is programmed by one or more modules, including an object recognition module 1121, a motion planning module 1129, and an object manipulation planning module 1126. The motion planning module 1129 (and any other module associated with the computing system 1100C) may access trajectory information 1128 and template information 1127, as necessary.

In an embodiment, the object recognition module 1121 may be configured to obtain and analyze image information as discussed throughout the disclosure. Methods, systems, and techniques discussed herein with respect to image information may use the object recognition module 1121. The object recognition module may be used both for object recognition and for repository recognition, as discussed herein. The object recognition module may further be configured for object recognition tasks related to object identification, as discussed herein.

The motion planning module 1129 may be configured plan and execute the movement of a robot. For example, the motion planning module 1129 may derive individual placement locations/orientations, calculate corresponding motion plans, or a combination thereof for grabbing and moving objects. The motion planning module 1129 may access and update trajectory information 1128. Trajectory information 1128 may include pre-planned initial trajectory information accessible and updateable by the motion planning module 1129. The motion planning module may also store adjusted trajectory information. The motion planning module 1129 may access and update template information 1127, including object template information and repository template information (both source and destination), as discussed in greater detail below. Methods, systems, and techniques discussed herein with respect to robotic arm movements and trajectories may be performed by the motion planning module 1129. Methods, systems, and techniques discussed herein with respect models and templates may be performed by the motion planning module 1129.

The object manipulation planning module 1126 may be configured to plan and execute the object manipulation activities of a robotic arm, e.g., grasping and releasing objects and executing robotic arm commands to aid and facilitate such grasping and releasing.

The loading environment management module 1122 may be configured to manage the loading environment. The loading environment management module 1122 may thus be configured to determine destination locations for both existing and incoming objects and may further be configured to formulate and provide commands related to pallet exchange and movement, as discussed further below.

Figure 2E:
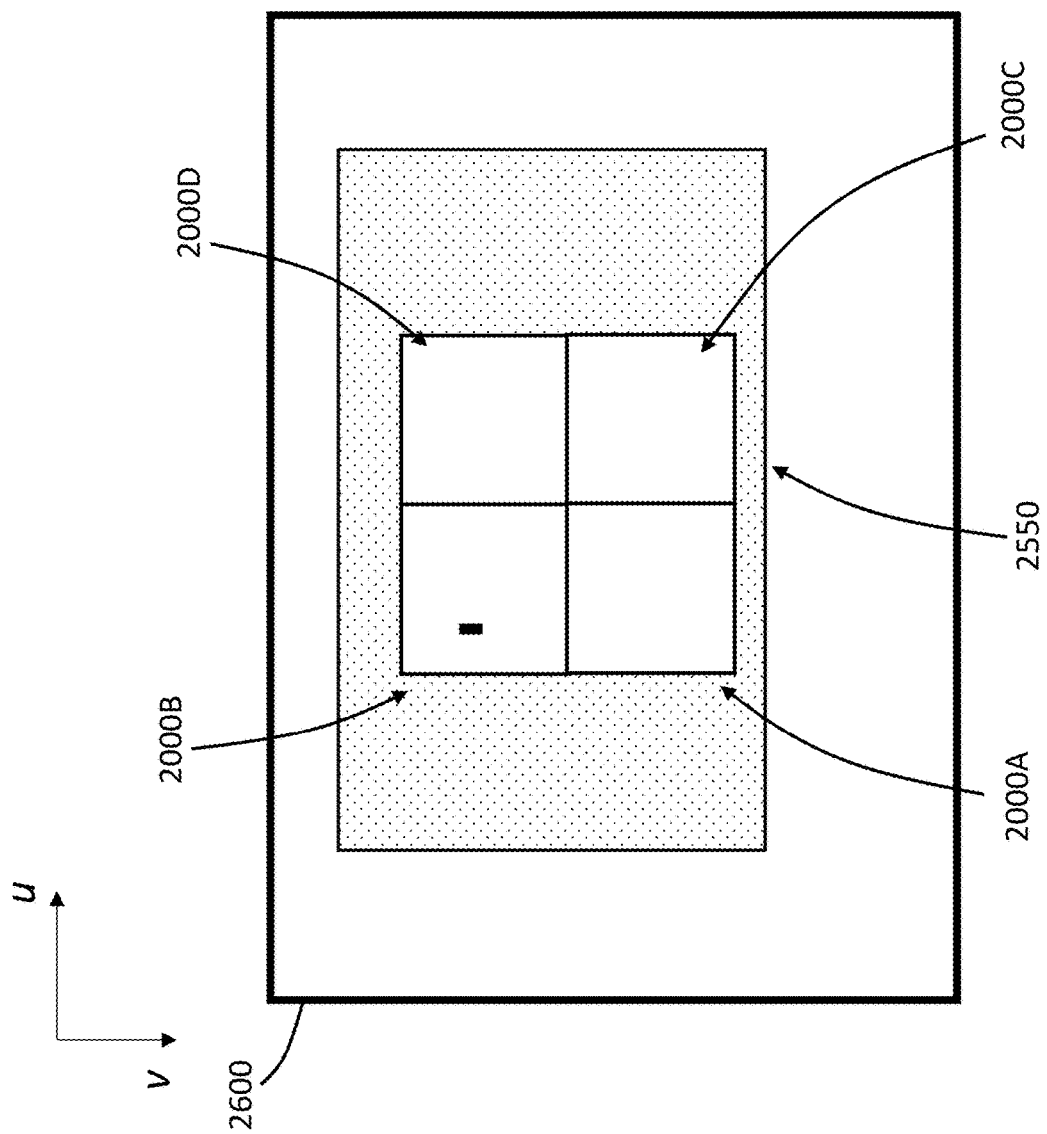
FIG. 2E is an example of image information processed by systems and consistent with embodiments hereof.
Figure 2F:
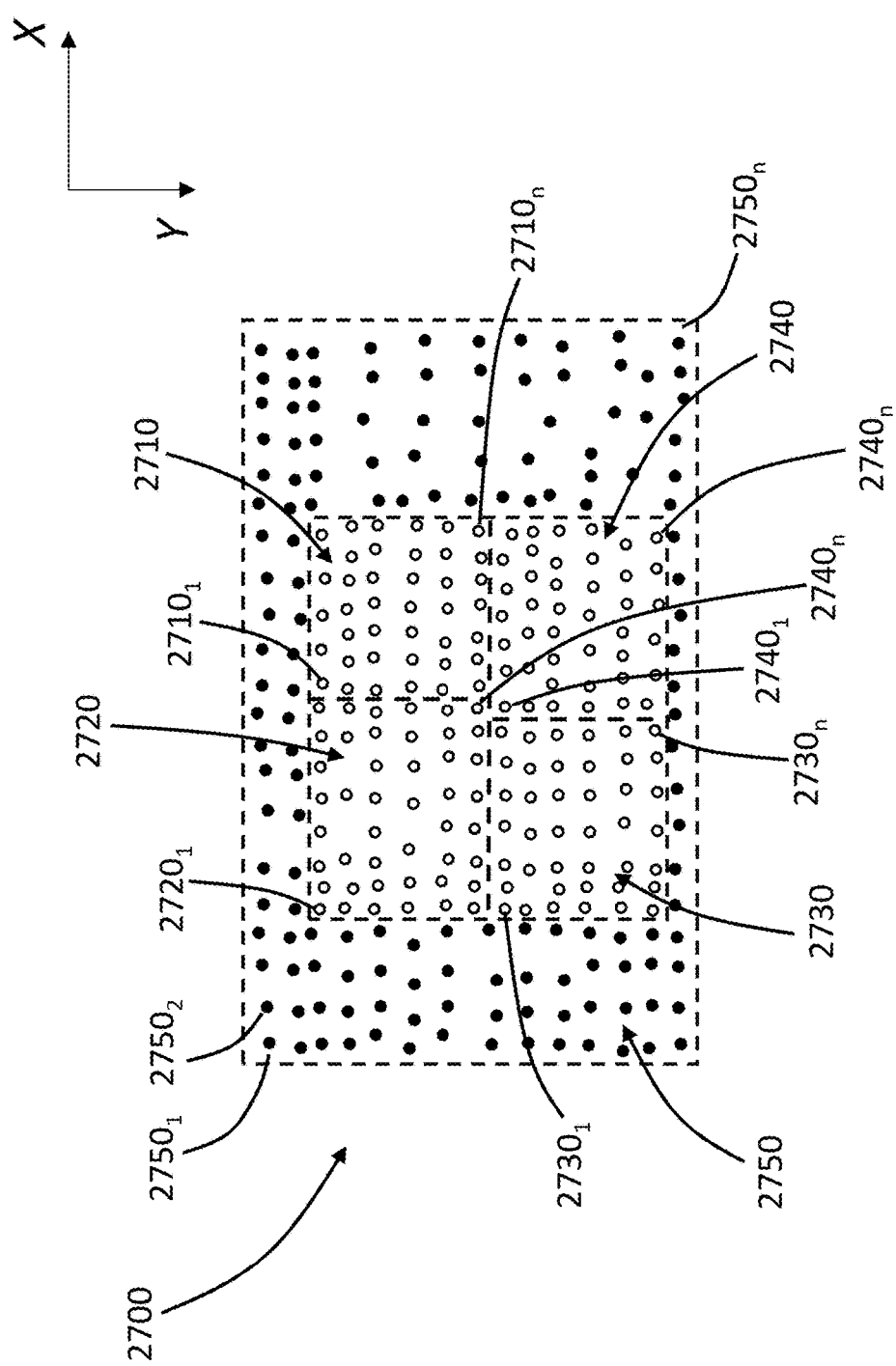
FIG. 2F is another example of image information processed by systems and consistent with embodiments hereof.
Figure 3A:
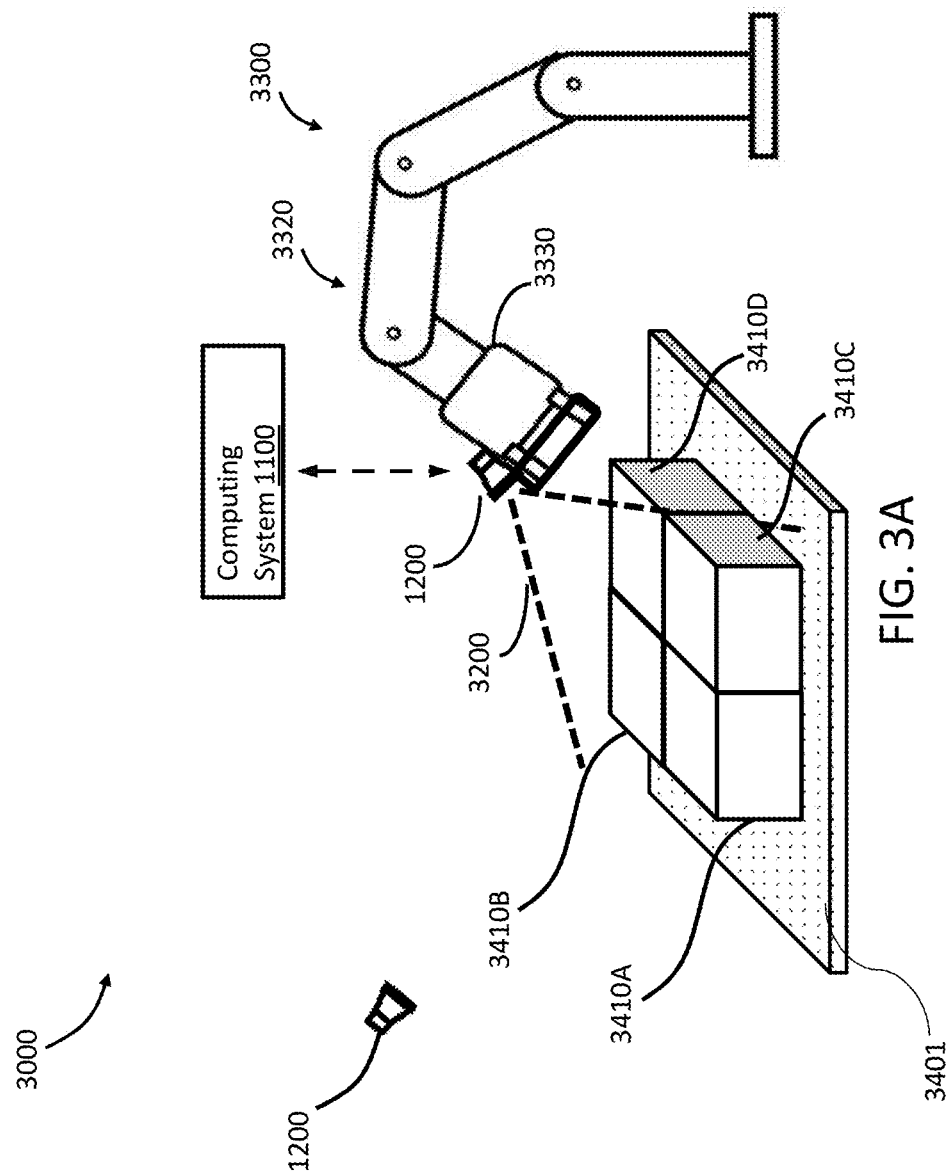
FIG. 3A illustrates an exemplary environment in which the planning and placement of objects within a loading environment may be performed, according to embodiments hereof.
Figure 3B:
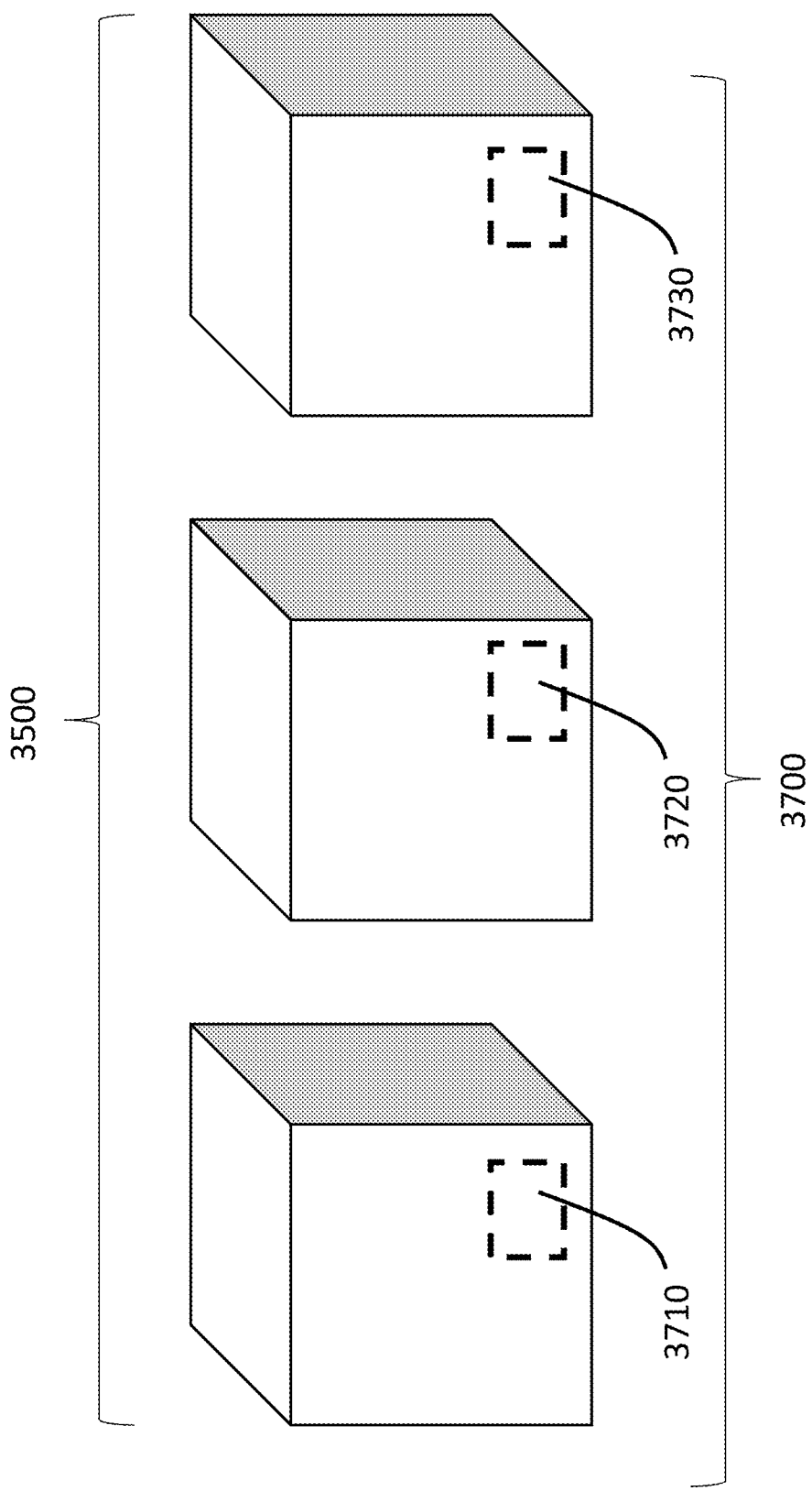
FIG. 3B is an exemplary embodiment of objects containing object type identifiers disposed thereon, according to embodiments hereof.

With reference to FIGS. 2E, 2F and 3A, methods related to the object recognition module 1121 that may be performed for image analysis are explained. FIGS. 2E and 2F illustrate example image information associated with image analysis methods while FIG. 3A illustrates an example robotic environment associated with image analysis methods. References herein related to image analysis by a computing system may be performed according to or using spatial structure information that may include depth information which describes respective depth value of various locations relative a chosen point. The depth information may be used to identify objects or estimate how objects are spatially arranged. In some instances, the spatial structure information may include or may be used to generate a point cloud that describes locations of one or more surfaces of an object. Spatial structure information is merely one form of possible image analysis and other forms known by one skilled in the art may be used in accordance with the methods described herein.

Figure 3C:
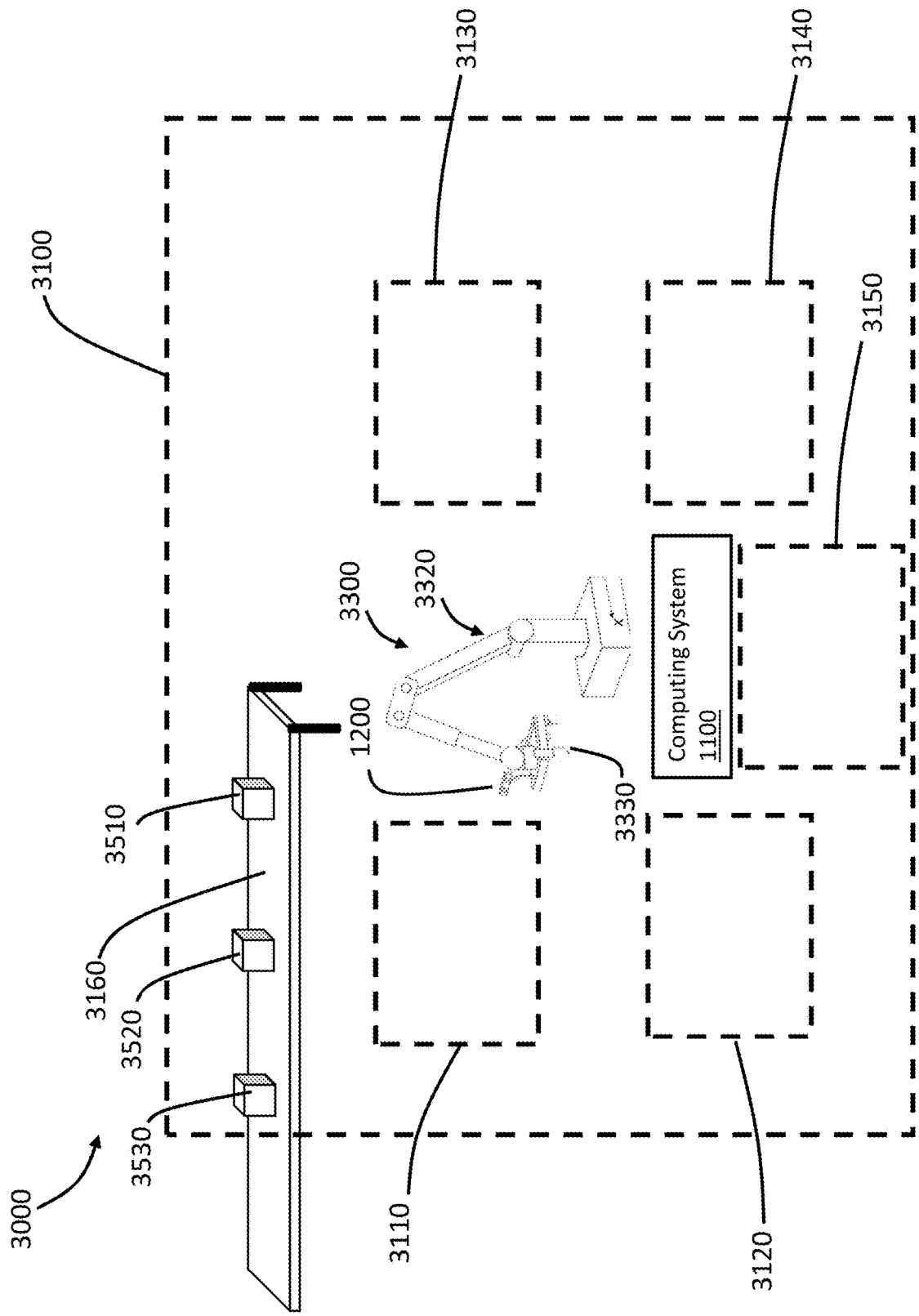
FIG. 3C illustrates another exemplary embodiment in which the planning and placement of objects within a loading environment may be performed, according to embodiments hereof.
Figure 3D:
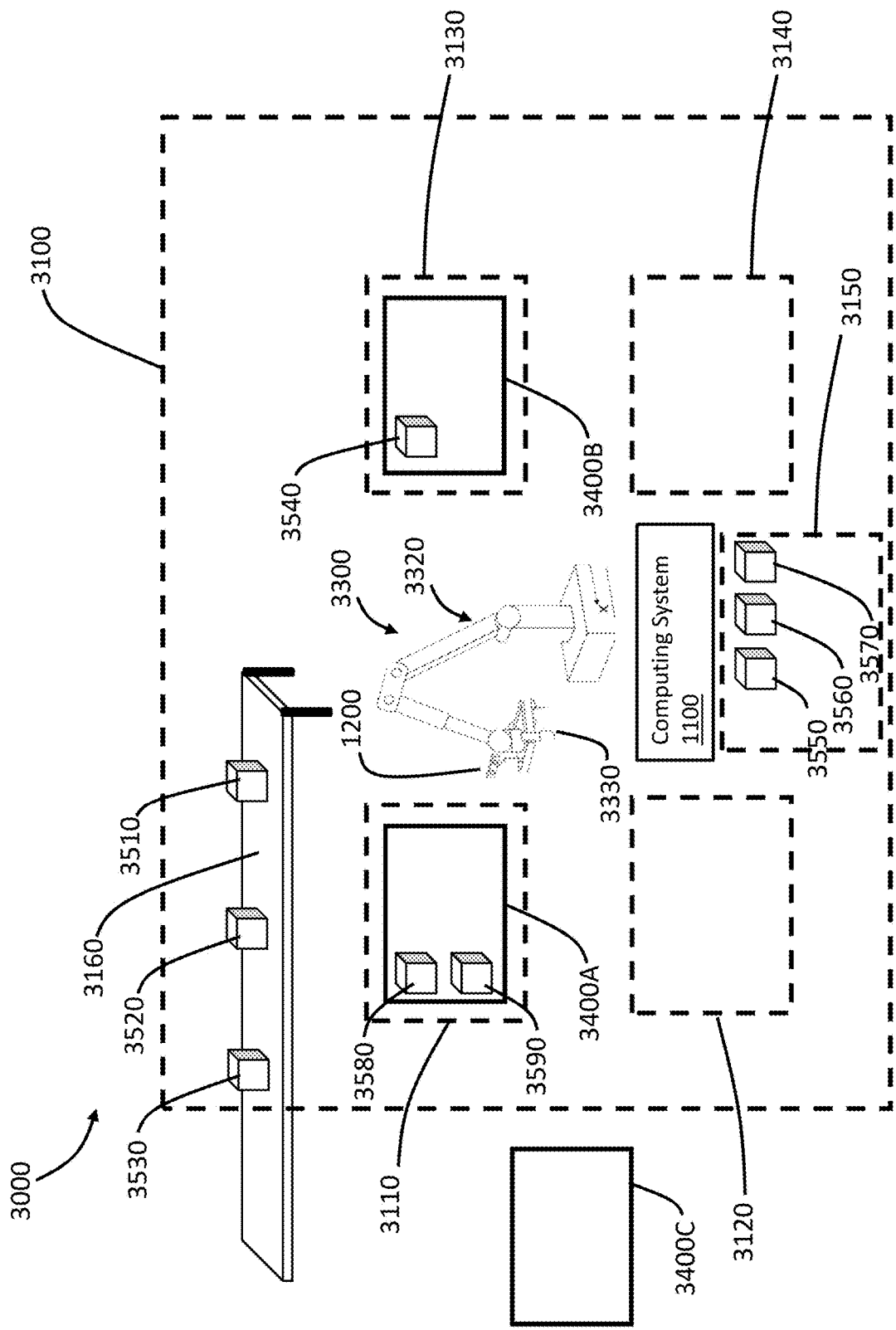
FIG. 3D depicts the loading environment and system of FIG. 3C at a later stage of execution of the system and methods described herein, according to embodiments hereof.

In embodiments, the computing system 1100 may obtain image information representing an object in a camera field of view (e.g., 3200) of a camera 1200. In some instances, the object may be a first object (e.g., 3500) of one or more objects (e.g., 3510-3590, as shown in FIGS. 3C-3D) in the camera field of view 3200 of a camera 1200. The image information 2600, 2700 may be generated by the camera (e.g., 1200) when the group of objects 3410A/3410B/3410C/3410D is (or has been) in the camera field of view 3200 and may describe one or more of the individual objects. The object appearance describes the appearance of an object 3410A/3410B/3410C/3410D from the viewpoint of the camera 1200. If there are multiple objects in the camera field of view, the camera may generate image information that represents the multiple objects or a single object, as necessary. The image information may be generated by the camera (e.g., 1200) when the group of objects is (or has been) in the camera field of view, and may include, e.g., 2D image information and/or 3D image information.

As an example, FIG. 2E depicts a first set of image information, or more specifically, 2D image information 2600, which, as stated above, is generated by the camera 1200 and represents the objects 3410A/3410B/3410C/3410D/3401 of FIG. 3A. More specifically, the 2D image information 2600 may be a grayscale or color image and may describe an appearance of the objects 3410A/3410B/3410C/3410D/3401 from a viewpoint of the camera 1200. In an embodiment, the 2D image information 2600 may correspond to a single-color channel (e.g., red, green, or blue color channel) of a color image. If the camera 1200 is disposed above the objects 3410A/3410B/3410C/3410D/3401, then the 2D image information 2600 may represent an appearance of respective top surfaces of the objects 3410A/3410B/3410C/3410D/3401. In the example of FIG. 2E, the 2D image information 2600 may include respective portions 2000A/2000B/2000C/2000D/2550, also referred to as image portions, that represent respective surfaces of the objects 3410A/3410B/341C/3410D3401. In FIG. 2E, each image portion 2000A/2000B/2000C/2000D/2550 of the 2D image information 2600 may be an image region, or more specifically a pixel region (if the image is formed by pixels). Each pixel in the pixel region of the 2D image information 2600 may be characterized as having a position that is described by a set of coordinates [U, V] and may have values that are relative to a camera coordinate system, or some other coordinate system, as shown in FIGS. 2E and 2F. Each of the pixels may also have an intensity value, such as a value between 0 and 255 or 0 and 1023. In further embodiments, each of the pixels may include any additional information associated with pixels in various formats (e.g., hue, saturation, intensity, CMYK, RGB, etc.)

As stated above, the image information may in some embodiments be all or a portion of an image, such as the 2D image information 2600. In examples, the computing system 1100 may be configured to extract an image portion 2000A from the 2D image information 2600 to obtain only the image information associated with a corresponding object 3410A. For instance, the computing system 1100 may extract the image portion 2000A by performing an image segmentation operation based on the 2D image information 2600 and/or 3D image information 2700 illustrated in FIG. 2F. In some implementations, the image segmentation operation may include detecting image locations at which physical edges of objects appear (e.g., edges of a box) in the 2D image information 2600 and using such image locations to identify an image portion (e.g., 5610) that is limited to representing an individual object in a camera field of view (e.g., 3200).

FIG. 2F depicts an example in which the image information is 3D image information 2700. More particularly, the 3D image information 2700 may include, e.g., a depth map or a point cloud that indicates respective depth values of various locations on one or more surfaces (e.g., top surface or other outer surface) of the objects 3410A/3410B/3410C/3410D/3401. In some implementations, an image segmentation operation for extracting image information may involve detecting image locations at which physical edges of objects appear (e.g., edges of a box) in the 3D image information 2700 and using such image locations to identify an image portion (e.g., 2730) that is limited to representing an individual object in a camera field of view (e.g., 3410A).

The respective depth values may be relative to the camera 1200 which generates the 3D image information 2700 or may be relative to some other reference point. In some embodiments, the 3D image information 2700 may include a point cloud which includes respective coordinates for various locations on structures of objects in the camera field of view (e.g., 3200). In the example of FIG. 2F, the point cloud may include respective sets of coordinates that describe the location of the respective surfaces of the objects 3410A/3410B/3410C/3410D/3401. The coordinates may be 3D coordinates, such as [X Y Z] coordinates, and may have values that are relative to a camera coordinate system, or some other coordinate system. For instance, the 3D image information 2700 may include a first image portion 2710, also referred to as an image portion, that indicates respective depth values for a set of locations $2710_1$-$2710_n$, which are also referred to as physical locations on a surface of the object 3410D. Further, the 3D image information 2700 may further include a second, a third, and a fourth portion 2720, 2730, and 2740. These portions may then further indicate respective depth values for a set of locations, which may be represented by $2720_1$-$2720_n$, $2730_1$-$2730_n$, and $2740_1$-$2740_n$, respectively. These figures are merely examples, and any number of objects with corresponding image portions may be used. Similarly to as stated above, the 3D image information 2700 obtained may in some instances be a portion of a first set of 3D image information 2700 generated by the camera. In the example of FIG. 2E, if the 3D image information 2700 obtained represents a first object 3410A of FIG. 3A, then the 3D image information 2700 may be narrowed as to refer to only the image portion 2710.

In an embodiment, an image normalization operation may be performed by the computing system 1100 as part of obtaining the image information. The image normalization operation may involve transforming an image or an image portion generated by the camera 1200, so as to generate a transformed image or transformed image portion. For example, if the image information, which may include the 2D image information 2600, the 3D image information 2700, or a combination of the two, obtained may undergo an image normalization operation to attempt to cause the image information to be altered in viewpoint, object pose, lighting condition associated with the visual description information. Such normalizations may be performed to facilitate a more accurate comparison between the image information and model (e.g., template) information. The viewpoint may refer to a pose of an object relative to the camera 1200, and/or an angle at which the camera 1200 is viewing the object when the camera 1200 generates an image representing the object.

For example, the image information may be generated during an object recognition operation in which a target object is in the camera field of view 3200. The camera 1200 may generate image information that represents the target object when the target object has a specific pose relative to the camera. For instance, the target object may have a pose which causes its top surface to be perpendicular to an optical axis of the camera 1200. In such an example, the image information generated by the camera 1200 may represent a specific viewpoint, such as a top view of the target object. In some instances, when the camera 1200 is generating the image information during the object recognition operation, the image information may be generated with a particular lighting condition, such as a lighting intensity. In such instances, the image information may represent a particular lighting intensity, lighting color, or other lighting condition.

In an embodiment, the image normalization operation may involve adjusting an image or an image portion of a scene generated by the camera, so as to cause the image or image portion to better match a viewpoint and/or lighting condition associated with information of a model template. The adjustment may involve transforming the image or image portion to generate a transformed image which matches at least one of an object pose or a lighting condition associated with the visual description information of the model template.

The viewpoint adjustment may involve processing, warping, and/or shifting of the image of the scene so that the image represents the same viewpoint as the visual description information in the model template. Processing, for example, includes altering the color, contrast, or lighting of the image, warping of the scene may include changing the size, dimensions, or proportions of the image, and shifting of the image may include changing the position, orientation, or rotation of the image. In an example embodiment, processing, warping, and or/shifting may be used to alter an object in the image of the scene to have an orientation and/or a size which matches or better corresponds to the visual description information of the model template. If the model template describes a head-on view (e.g., top view) of some object, the image of the scene may be warped so as to also represent a head-on view of an object in the scene.

Further aspects of the object recognition methods performed herein are described in greater detail in U.S. application Ser. No. 16/991,510, filed Aug. 12, 2020, and U.S. application Ser. No. 16/991,466, filed Aug. 12, 2020, each of which is incorporated herein by reference.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

FIGS. 3A-3D illustrate exemplary environments in which the computer-readable program instructions stored on the non-transitory computer-readable medium 1120 are utilized via the computing system 1100 to maximize efficiency of placement and loading operations using the motion planning module 1129 and object manipulation planning module 1126 with the robotic system disclosed herein. The image information obtained by the computing system 1100 and exemplified in FIG. 3A influences the system's decision-making procedures and command outputs to a robot 3300 present within a loading environment 3100 disclosed herein, as shown in FIGS. 3C-3D. Loading environment 3100 may include at least one loading area 3110 (or a plurality of loading areas 3110, 3120, 3130, 3140 shown in FIG. 3C) for receiving an object (e.g. any of the plurality of objects 3510-3590), and/or, for example, a pallet 3400. A buffer zone 3150 may further be included in the loading environment for receiving overflow objects 3550/3560/3570. An object queue 3160 may include a queue of incoming objects 3510/3520/3530 arriving in the loading environment for retrieval and placement elsewhere within the loading environment via the robot 3300. In embodiments, more than one object queue 3160 may be provided to supply the incoming objects 3510/3520/3530 to the loading environment. The object queue 3160 may be provided by any suitable means of object transport, including, for example, a conveyor belt (as illustrated in FIG. 3C), as well as pallets, vehicles, shelves, containers, etc.

The robot 3300, which may also be disposed within the loading environment 3100, includes an arm 3320 with an end effector apparatus 3330 designed for grasping and releasing objects 3500. The end effector apparatus 3330 may include, for example, a suction cup, robotic grippers, and/or any other robotic tool suitable for grasping and releasing objects. Camera 1200 may be disposed on the end effector apparatus 3330 of the robot to provide a dynamic "first person view" from the robot, such as a view from the end effector apparatus 3330, to the computing system 1100. In embodiments, the camera 1200 may alternatively be placed on the arm 3320 of the robot. The camera 1200 may also be placed in a static position within the loading environment, instead of being attached to the robot 3300. In a further alternative, the camera 1200 may be placed on the robot, and a second camera 1200 may be placed in a static position within the loading environment separate from the robot, to provide the computing system 1100 with multiple angles of the environment and/or objects 3500 to be interacted with via the robot 3300. The robot's 3300 placement within the loading environment 3100 is determinative on the robot's ability to reach the loading areas 3110/3120/3130/3140, buffer zone 3150, and object queue 3160. In an embodiment, the robot may further have motion capabilities to assist in properly reaching all areas within the loading environment.

The objects 3510-3590 (collectively identified as objects 3500 in the example of FIG. 3B) provided to, or available within, the loading environment 3100 are each associated with an object type identifier 3710, 3720, 3730 (collectively referred to as object type identifier 3700) for detection, identification, and/or recognition via the computing system 1100. The object type identifier 3700 is a data object indicative of the type of object that it is associated with. For example, an object type identified 3700 may identify an object type by box size, shape, or weight, by contents, origin, destination, or any other suitable identifying attribute. In an embodiment, the object type identifier 3700 may be obtained by the computing system 1100 via identification or reading of a physical identifier located on or contained within the objects 3500. For example, the object type identifier 3700 may be stored in or on or identified by a unique stock-keeping unit (SKU) code, a universal product code (UPC), an address label, a radiofrequency identification (RFID) tag, or any other type of barcode, indicia, and/or wireless tracking device or system used in the tracking and trade of items or products. In further embodiments, object recognition techniques may be employed to recognize object types (e.g., according to object template matching) and assign object type identifiers 3700 to objects 3500 accordingly. Objects 3500 associated with a certain object type identifier 3700 can be categorized or grouped with other objects having similar or same object type identifiers. In doing so, the computing system 1100 can best determine execution of robot picking and placing operations, pallet control operations (e.g. palletization or de-palletization operations), and buffer zone operations, among others. The object type identifiers 3700 may either correspond to, or be non-corresponding to, a pallet identifier of a pallet 3400. The corresponding/non-corresponding status of the object 3500 as provided by the object type identifier 3700 may be determined by the computing system 1100.

Pallets 3400 may be received within each of the provided loading zones 3110/3120/3130/3140 for the reception of at least one of the plurality of objects 3510-3590. In embodiments, the pallets 3400 are identified, for example, by a pallet identifier, via the computing system 1100 to receive corresponding objects 3500 having corresponding object type identifiers 3700. Thus, any pallet 3400 present or existing within at least one of the loading areas 3110/3120/3130/3140 may receive the corresponding object or objects 3510-3590 having object type identifiers 3700 corresponding to their pallet identifiers. Non-corresponding objects 3500 having non-corresponding object type identifiers 3700 may be placed in the buffer zone 3150, or may trigger a pallet swap. The pallet swap decision may be dependent on a fill status of the various loading areas, buffer area, and pallet or pallets within the loading environment, the method for which is discussed in greater detail below.

Any pallet transportation operation, such as pallet swapping, may involve transporting pallets via automated machinery or vehicles (forklifts or other vehicles such as automated guided vehicles "AGV's", additional or outside robots (not shown), human interaction, mechanical systems (not shown), and any other suitable conveyance. These may introduce delays in the palletization process. For example, the robot 3300 may have to halt operations for some time for an AGV (or other conveyance) to drive or move an existing pallet 3400A/3400B out of the loading environment 3100 (or out of its designated loading area 3110/3120/3130/3140), and for another AGV (or other conveyance) to drive or move a new pallet 3400C into the loading environment 3100 (or into the now-empty loading area 3110/3120/3130/3140). This delay in operations may take place each time a pallet swap operation is required. The buffer zone 3150 may therefore be implemented to reduce the need for pallet swapping, which in turn reduces the amount of down-time incurred from each instance of a pallet swap.

The buffer zone 3150 acts as a temporary destination or repository for incoming objects 3510/3520/3530 provided from the queue or conveyor 3160 that lack an object type identifier 3700 corresponding to an existing pallet within the loading environment (e.g., within a loading area 3110-3140). The incoming objects 3510/3520/3530 with non-corresponding object type identifiers 3700 can thus be retrieved from the object queue 3160 by the robot and placed into the buffer zone 3150 to permit the object queue 3160 to continue advancing and supplying a continuous stream of incoming objects 3510/3520/3530. The non-corresponding objects 3500 may remain in the buffer zone until a pallet dedicated to receiving objects 3500 with that particular object type identifier 3700 (e.g., having a corresponding pallet identifier) is provided in the loading environment 3100. When such a pallet swap command is made, an existing pallet 3400A/3400B is removed from its respective loading area 3110/3130 so that pallet 3400C can take its place. The robot 3300 can then retrieve the overflow object or objects 3550-3570 within the buffer zone and move them to the pallet 3400C dedicated to receiving the object with its now corresponding object type identifier. In embodiments, more than one buffer zone can be provided within the loading environment to accommodate greater volumes of overflow objects provided via the object queue 3160.

The present disclosure relates to performing, facilitating, and/or planning the transfer of a plurality of incoming objects 3510/3520/3530 from the object queue 3160 (or, in the alternative, multiple queues or conveyors) to specified areas of the loading environment 3100. FIG. 4 depicts a flow diagram for an example method 4000 for performing, facilitating, and/or planning the transfer of the plurality of objects from the queue or conveyor to specified areas of the loading environment. In embodiments, operations of the object transfer method 4000 may be performed in conjunction with operations of a pallet management method 5000, described in greater detail below. The operations of the object transfer method 4000 function to manage the transfer of objects into the loading environment 3100. The operations of the pallet management method 5000 function to manage the transfer or pallets into and out of the loading environment 3100. Various operations of method 4000 and method 5000 may be performed in conjunction or combination with one another to achieve the goal of increasing the efficiency of the object transfer into pallets within the loading environment.

In an embodiment, the method 4000 may be performed by, e.g., the computing system 1100 (or 1100A/1100B/1100C) of FIGS. 2A-2D or the computing system 1100 of FIGS. 3A-3D, or more specifically by the at least one processing circuit 1110 of the computing system 1100. In some scenarios, the computing system 1100 may perform the method 4000 by executing instructions stored on a non-transitory computer-readable medium (e.g., 1120). For instance, the instructions may cause the computing system 1100 to execute one or more of the modules illustrated in FIG. 2D, which may perform method 4000. For example, in embodiments, steps related to object recognition, e.g. operation 4001, operation 4002, operation 4003, operation 4004, and others, may be performed via the object recognition module 1121. For example, in embodiments, steps related to motion and trajectory planning, e.g., operation 4006, operation 4007, operation 4008, and others, may be performed via the motion planning module 1129. For example, in embodiments, steps related to object placement and handling, e.g., operation 4004, operation 4008, and others, may be performed by object manipulation planning module 1126. Operations related to loading environment management and understanding, e.g., operations 4005 and 4009, may be executed or performed by the loading environment management module 1122. In some embodiments, the motion planning module 1129 and object manipulation planning module 1126 may operate in concert to define and/or plan trajectories that involve both motion and object manipulation.

The steps of the method 4000 may be employed to achieve specific sequential robot trajectories for performing specific tasks. As a general overview, the method 4000 may operate to cause the computing system 1100 to transfer objects from the object queue 3160 to the loading areas 3110-3140 or the buffer zone 3150. Such a transfer operation may include operation of the robot 3300 according to a pre-planned trajectory that is updated and/or refined according to various operations occurring during the operation.

In the method 4000, the computing system 1100 may be configured and operated to control (e.g., provide commands for controlling) movement of the robot 3300 to retrieve an incoming object 3510/3520/3530 from an object queue 3160 and to place the incoming object 3510/3520/3530 into a designated area (e.g., loading area 3110-3140 or buffer zone 3150) within a loading environment 3100. The computing system 1100 may be configured to plan and adjust for subsequent object retrieval and placement procedures, based on numerous factors surrounding the object and the status of the loading environment, all of which can be gathered as image information via a camera. The computing system 1100 may determine an object moving command to retrieve an incoming object 3510/3520/3530 from the object queue 3160 and place it within a target loading area 3110-3140 provided within the loading environment 3100. In an embodiment, the computing system 1100 may decide to retrieve an incoming object 3510/3520/3530 from the object queue 3160 and place it within a buffer zone 3150 within the loading environment 3100. In another embodiment, the computing system 1100 may determine to retrieve an overflow object 3550/3560/3570 from a buffer zone 3150 and place it within a target loading area 3110-3140 provided within the loading environment 3100.

The description of method 4000 refers to movement Cycle A, illustrated in FIG. 5. The movement in Cycle A may include movement for a camera 1200 (e.g., camera attached to robotic arm 3320, or alternatively provided elsewhere within the loading environment separate from the robot, or both) in front of a loading environment 3100, (or more specifically, an object queue 3160, loading area 3110-3140, and/or buffer zone 3150) so that the camera 1200 can generate image information representing the loading environment 3100. The movement cycle A may include movement of the robotic arm 3320 to approach and grab or lift a target incoming object 3510 from the object queue 3160 (trajectory A1). The movement cycle A may include movement of the robotic arm 3320 to transport and deposit the target incoming object 3510 into one of the loading areas 3110-3140 or the buffer zone 3150 (trajectories A2a, A2b, A2c, A2d). The image information may be used by the computing system 1100 to determine the command to transmit or execute to cause the robot 3300 to carry out the trajectories A1, A2a, A2b, A2c, A2d.

In one type of movement cycle, referred to as Cycle A, depicted in FIG. 5, the computing system 1100 may output commands configured to cause the robot 3300 in the loading environment 3100 to move and retrieve one of the objects 3510/3520/3530 from the object queue 3160 using the end effector apparatus 3330 in trajectory A1. The computing system 1100 may then determine, based on the processed image information gathered via the camera 1200, whether the incoming object 3510/3520/3530 to be retrieved from the object queue 3160 is associated with an object type identifier 3700 corresponding to a loading area 3110/3120/3130/3140. The computing system 1100 may then control the robot 3300 to move and place the incoming object 3510/3520/3530 in the loading area 3110/3120/3130/3140 (trajectories A2a, A2b, A2d as examples) if the object type identifier 3700 of the retrieved incoming object 3510/3520/3530 corresponds. Alternatively, the computing system 1100 may then command or control the robot 3300 to move and place the incoming object 3510/3520/3530 in the buffer zone 3150 (trajectory A2c as an example) if the object type identifier 3700 of the retrieved incoming object 3510/3520/3530 does not correspond to a pallet identifier of a pallet in any of the loading areas 3110/3120/3130/3140. The computing system 1100 determines where to move and place the incoming object 3510/3520/3530 in the buffer zone 3150 based on multiple factors, including the size of the incoming object 3510/3520/3530, the location of other overflow objects 3550/3560/3570 already present within the buffer zone 3150, and the orientation of the other objects already present within the buffer zone 3150. The computing system 1100 accounts for these parameters so that future commands configured to move and retrieve the incoming objects 3510/3520/3530 that were placed in the buffer zone from the buffer zone are not hindered by outside factors such as other objects blocking the path of the robot arm 3320 and/or obstructing the view of the incoming object 3510/3520/3530 from the camera 1200 as it gathers image information pertaining to the object (e.g. a larger object 3500 is positioned in front of the incoming object 3510/3520/3530 thus obstructing the cameras view).

Movement cycle A is provided by way of example only. The robotic arm 3320 may be controlled to have other movement cycles that involve moving an object between other repositories functioning as sources or destinations. For example, the robot may move an object to the queue or conveyor from a loading area or buffer zone within the loading environment. In another example, the robot may move an object to a buffer zone from a loading area within the loading environment.

The description of movement cycle A should be understood as description of operations that involve the planning and placement of objects within a loading environment and/or around a robot. Movement cycles that require different combinations of source and destination repositories/locations may require different combinations and/or different ordering of the operations disclosed herein without departing from the scope of the disclosure.

The computing system 1100 may perform specific steps of method 4000 for transferring the incoming objects 3510/3520/3530 from the object queue 3160 into the loading environment 3100. The method 4000 may begin with or otherwise include an operation 4001, in which the computing system 1100 may detect the incoming queue of objects 3510/3520/3530 residing in the object queue 3160 and provided to the loading environment 3100, using the image information gathered as previously described above. In particular, the image information may be captured by the camera 1200 disposed on the end effector apparatus 3330 of the robot 3300, and/or via a secondary one or more cameras 1200 provided elsewhere in the loading environment 3100 separate from the robot 3300, or via the combination of the camera 1200 and the secondary one or more cameras 1200. The image information may include, for example, object queue image information and loading environment image information. The object queue image information includes image information of incoming objects 3510/3520/3530 in the object queue 3160. The loading environment image information includes image information of the existing objects 3540/3580/3590, pallets 3400, and other features of the loading environment. In an embodiment, the computing system 1100 may be pre-supplied or pre-loaded with information (including image information) related to or describing the object queue 3160, facilitating execution of operation 4001. Object recognition techniques as described herein may be employed to recognize or identify individual objects 3510/3520/3530 within the object queue 3160.

The method 4000 may further include an operation 4002, in which the computing system 1100 is configured to obtain or receive the plurality of object type identifiers 3710/3720/3730 pertaining to, or being associated with, respective incoming objects 3510/3520/3530 of the objects 3500 from the object queue 3160. The plurality of object type identifiers 3710/3720/3730 may be received, obtained, or otherwise determined via the image information (e.g., via object recognition, barcode, SKU, or QR code reading, etc.) gathered as previously described above. Alternatively, the object type identifiers 3710/3720/3730 may be pre-supplied or pre-loaded into the computing system. In embodiments, the object type identifiers 3710/3720/3730 may be provided to the robotic system via a separate processor/system. In further embodiments, the object type identifiers 3710/3720/3730 may be received or obtained from a system configured to read wireless identifiers (for example, RFID tags) associated with the incoming objects 3510/3520/3530. The object type may have been determined by the computing system 1100 itself, or by another system in communication with the computing system 1100.

The method 4000 may further include an operation 4003, in which the computing system 1100 obtains or receives image information pertaining to a target object (e.g. the next incoming object 3510 identified by the robotic system to be retrieved via the robot 3300) in the queue 3160. The computing system 1100 may further be configured to determine that an incoming object 3510 closest to the robot among a sequence of incoming objects 3510/3520/3530 arriving via the queue 3160 is next to be picked up by the robot 3300, thus becoming the target incoming object 3510. The computing system 1100 may further be configured to use the previously obtained object type identifier 3700 associated with the target incoming object 3510 in determining whether the target incoming object 3510 is a corresponding object having a corresponding object type identifier 3700 (e.g., corresponding to a pallet identifier associated with a pallet in one of loading areas 3110-3140), or a non-corresponding object having a non-corresponding object type identifier 3700 (e.g., not corresponding to a pallet identifier associated with a pallet in one of loading areas 3110-3140). In an embodiment, the robotic system may be further configured for identifying the object type identifier 3700 associated with the target object, and assigning the object type identifier 3700 to the target incoming object 3510 based on the indicia identified.

The method 4000 may further include an operation 4004, which determines a target object pose of the target incoming object 3510 in the queue 3160, based on the image information of the object queue 3160 received from the camera. The target object pose may include the size, orientation, and position of the target object within the object queue 3160, among other variables as previously described above. The target object pose may be utilized in later performing a retrieve command to ensure proper retrieval of the target incoming object 3510 from the object queue 3160 is achieved. The computing system 1100 may further be configured to use the image information in determining whether the target incoming object 3510 is a corresponding object having a corresponding object type identifier, or a non-corresponding object having a non-corresponding object type identifier.

The method 4000 may further include an operation 4005, wherein the computing system 1100 determines a target object placement for the target incoming object 3510, indicating a planned placement location of the target incoming object 3510 in the loading environment 3100. The planned placement location may further be determined as a loading area 3110/3120/3130/3140 if the target incoming object 3510 is deemed to be a corresponding object (i.e. the object type identifier 3700 of the target incoming object 3510 aligns, or corresponds with, a pallet identifier of a pallet disposed in one of the available loading areas 3110-3140). The planned placement location may alternatively be the buffer zone 3150 if the target incoming object 3510 is deemed to be a non-corresponding object (i.e. the object type identifier 3700 of the target incoming object 3510 does not align, or correspond with, a pallet identifier of a pallet located in one of the available loading areas 3110-3140). In determining target object placement, the computing system 1100 may further be configured for executing a pallet detection operation by processing the loading environment image information to determine a pose of a pallet provided in the loading area, e.g., using object recognition techniques as disclosed herein.

The method 4000 may further include an operation 4006, wherein the computing system 1100 may perform a motion planning operation via the motion planning module 1129 as previously described above for the retrieval and placement of the target incoming object 3510. The motion planning operation may include determining a series of commands configured to cause motion or movement of the robot 3300. In embodiments, this motion or movement may include movement of the robot arm 3320, and/or movement of the end effector apparatus 3330. The motion planning operation may be performed based on the image information previously gathered in the operation 4003. For example, the computing system 1100 may determine what direction and/or angle to control movement of the arm 3320 with respect to the target object to be retrieved. The computing system 1100 may further determine what direction and/or angle to control the end effector apparatus with respect to the target object to be retrieved. In an embodiment, operation 4006 may factor in orientation, weight, size, and other physical data directed to the target object pose generated from the object queue image information. This information pertaining to the target object pose may further be integrated into the target object planned placement location.

The method 4000 may further include an operation 4007, wherein the robotic system may transmit or execute a retrieve command for retrieving the target incoming object 3510 (shown as movement or step A1 in FIG. 5) from the object queue 3160 according to the motion planning operation. The retrieve command may be configured to cause the robot 3300 to move in the trajectory A1 towards the target incoming object 3510, and use end effector apparatus 3330 in gripping the target object. The operation 4007 may further include transmitting or executing an initiation command configure to cause the robot to begin the motion A2a/A2b/A2c/A2d from the object queue 3160 to the destination of the target incoming object 3510 (loading areas 3110/3120/3130/3140, or buffer zone 3150, for example).

The method 4000 may further include an operation 4008, wherein the computing system 1100 transmits or executes a placement command for placing the target incoming object 3510 in the target loading area 3110/3120/3130/3140 according to the motion planning operation.

The computing system 1100 may further be configured for controlling the robot arm 3320 to place the corresponding target incoming object 3510 on the pallet 3400 in the loading area 3110/3120/3130/3140 in association with various operations of a loading environment pallet management method (e.g., method 5000 as described in greater detail below). For example, before or during object placement, the computing system 1100 may execute one or more operations of a pallet management method 5000. For example, a pallet detection operation 5003, a pallet status operation 5005, a pallet identification operation 5006, a pallet swap operation 5007, etc., may be performed, in any combination, prior to or on conjunction with an object placement operation.

For example, object placement may be performed according to the results of a pallet detection operation (for example, pallet detection operation 5003 described in greater detail below). The pallet detection operation may be invoked by the computing system 1100 to confirm whether existing pallets are present within the loading environment 3100 (i.e. within a designated loading area 3110/3120/3130/3140).

For example, object placement may be performed according to the results of detecting a fill status of existing pallets 3400A/3400B (e.g., operation 5004 described in greater detail below) confirmed to be within the loading environment 3100. In an embodiment, the pallet fill status is determined via the image information captured by the camera 1200. The camera 1200 may be a camera in-hand solution (also known as a camera on-hand solution), where the camera 1200 is disposed on the robot arm 3320. The robot arm 3320 may then move to various picking regions (such as the pallets 3400, the buffer zone 3150, or the queue 3160) to capture the image information from multiple different angles. In embodiments, the camera 1200 may be located remote from the robot 3300. In embodiments, multiple cameras 1200, remote and/or in-hand may be used. As previously described above, and with reference to FIGS. 2E, 2F and 3A, the computing system 1100 employs the methods related to the object recognition module 1121 that may be performed for image analysis. For example, 3d image information 2700, (e.g., spatial structure information), which may include depth information that describes respective depth value of various locations relative a chosen point may be used in determining the pallet fill status. The depth information may be used to identify existing objects 3540/3580/3590 present on the pallets 3400A/3400B, and/or estimate how the existing objects 3540/3580/3590 are spatially arranged on the pallets 3400A/3400B. In some embodiments, the 3d image information 2700 may include or may be used to generate a point cloud that describes locations of one or more surfaces of the existing objects 3540/3580/3590. 3d image information 2700 is merely one form of possible image analysis and other forms, such as analysis of 2d image information 2600, known by one skilled in the art may be used in accordance with the methods described herein.

Figure 7A:
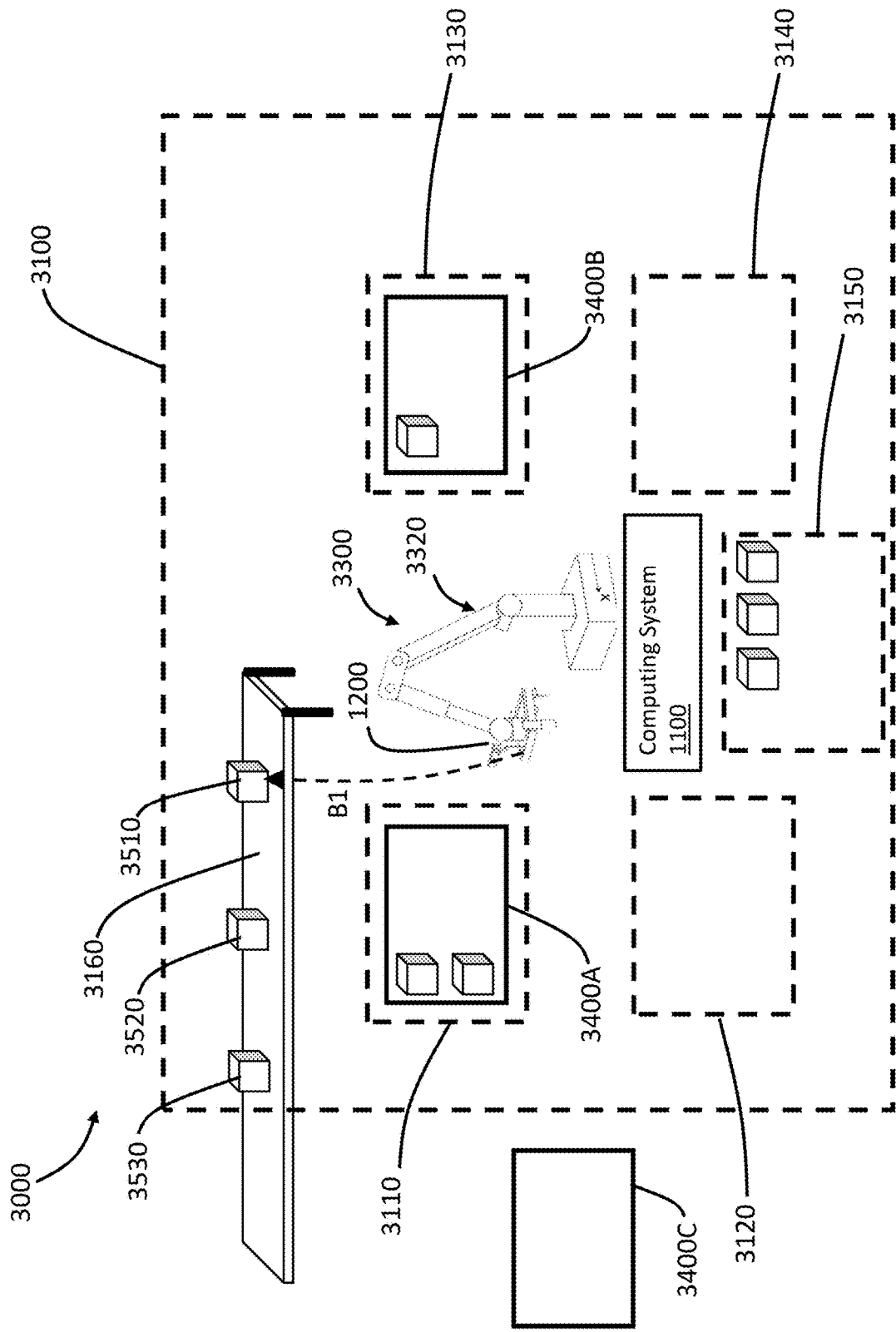
FIG. 7A depicts an object loading environment consistent with embodiments hereof.
Figure 7B:
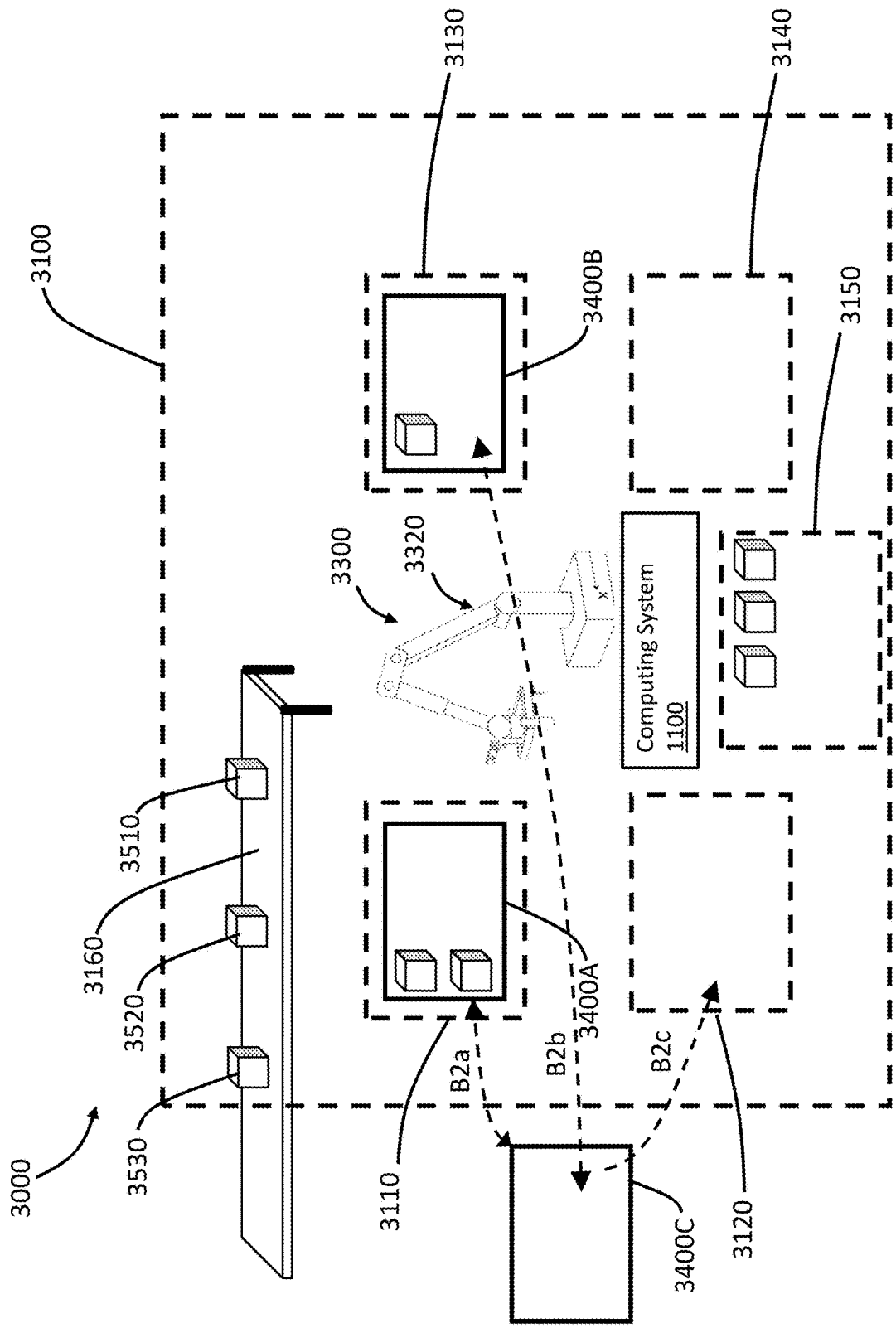
FIG. 7B depicts an object loading environment consistent with embodiments hereof.
Figure 7C:
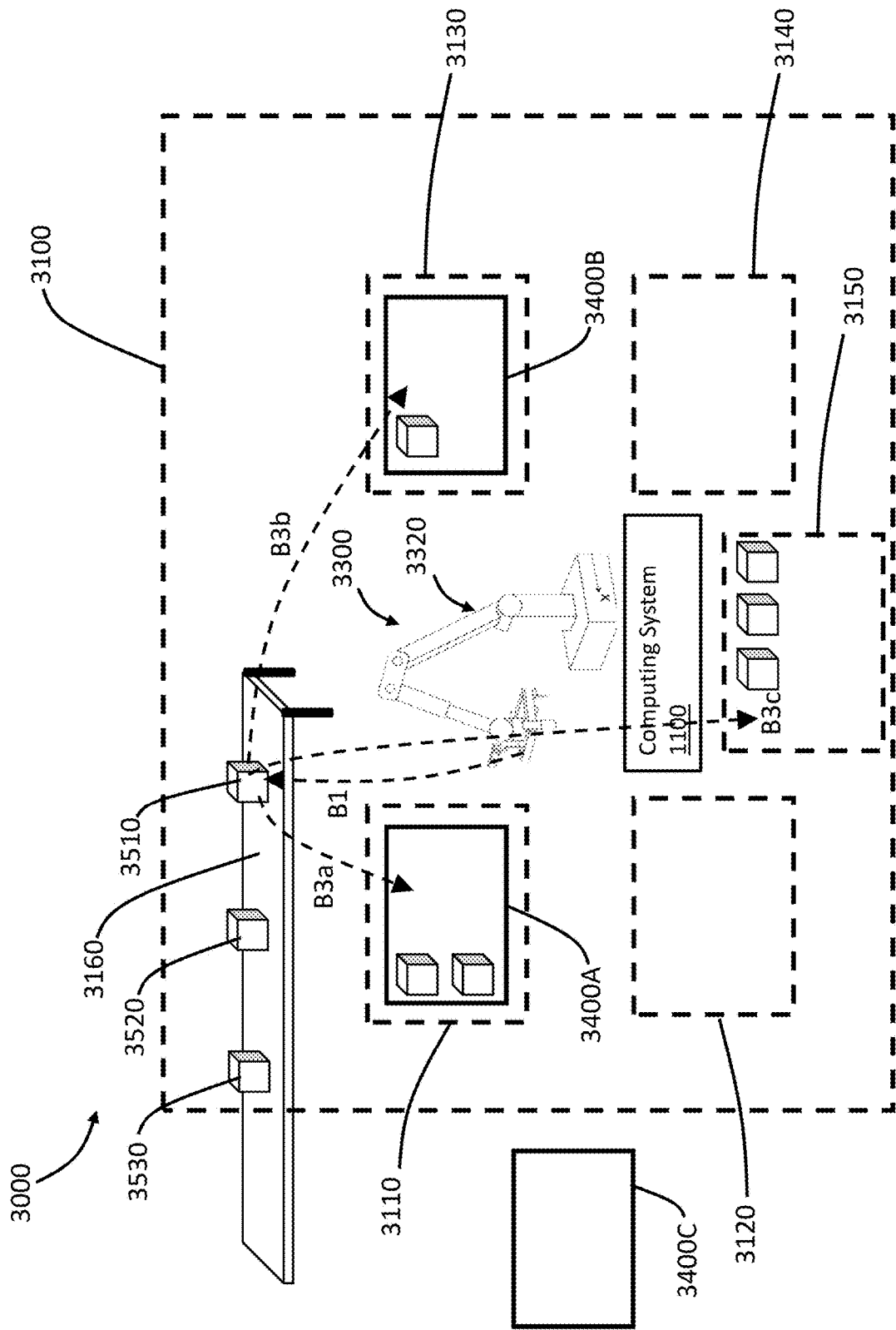
FIG. 7C depicts an object loading environment consistent with embodiments hereof.
Figure 7D:
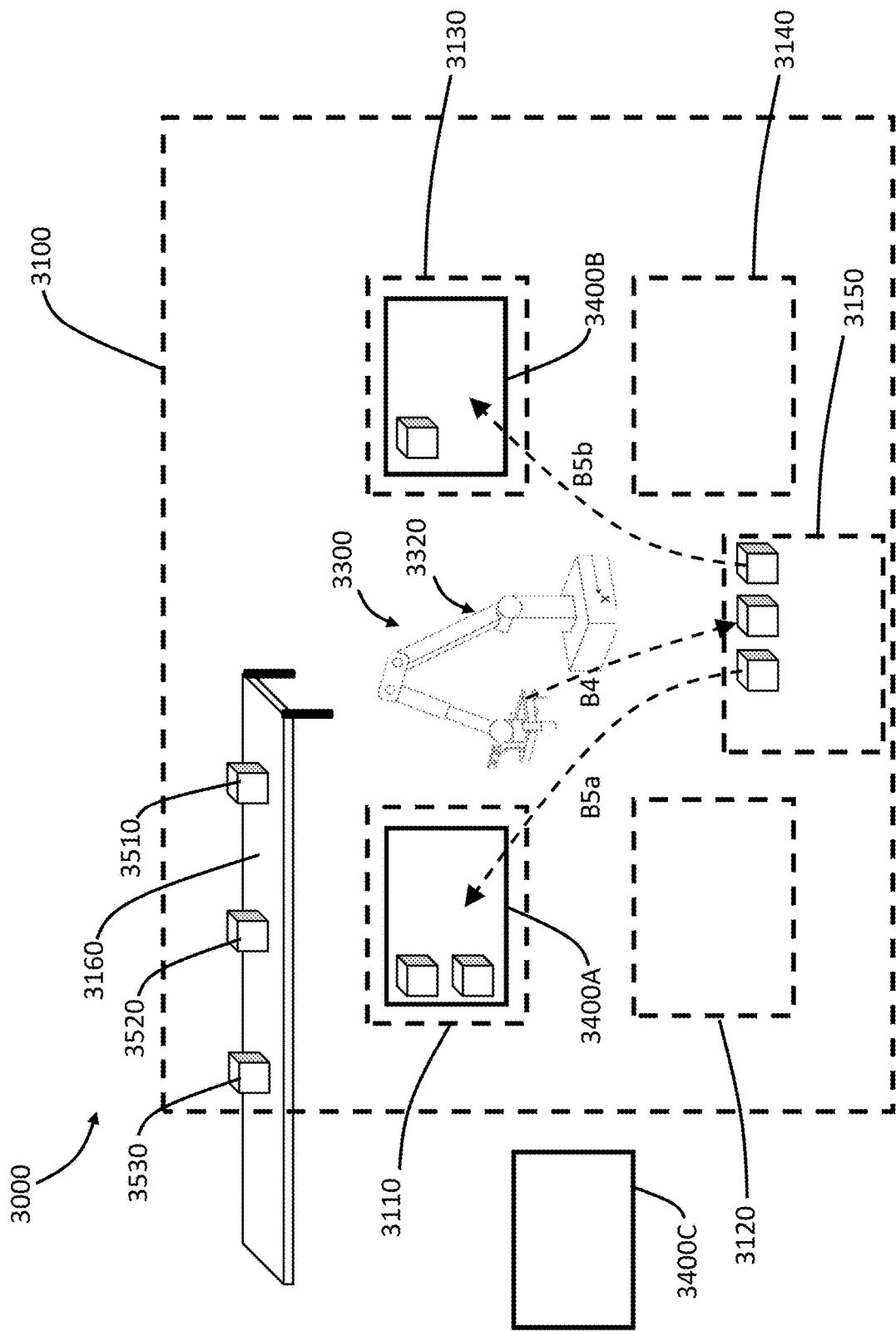
FIG. 7D depicts an object loading environment consistent with embodiments hereof.

For example, object placement may be performed subsequent to execution of a pallet swap operation (e.g., operation 5007) configured to cause replacement of an existing pallet 3400A/3400B within the loading environment with a new pallet 3400C from outside of the loading environment 3100. New pallet 3400C may be retrieved and moved into the loading environment 3100, e.g., by automated machinery (forklifts or other vehicles such as AGVs), outside robots (not shown), human interaction, mechanical systems (not shown), and any other suitable conveyance. In an embodiment, the computing system 1100 may find that a pallet swap operation is required, due to the insufficiency of the existing pallet 3400A/3400B (e.g. the pallet identifier does not correspond to object type identifiers 3700 associated with numerous incoming 3510/3520/3530, existing objects 3540/3580/3590, and/or overflow objects 3550/3560/3570 that are to be moved). The computing system 1100 may thus, in response to a determination that a pallet swap command is required, cause the pallet swap to exchange the existing pallet 3400A/3400B with a new pallet 3400C (shown as trajectory B2a/B2b in FIG. 7A). In an embodiment, the existing pallet 3400A/3400B and new pallet 3400C may be swapped via outside forces, e.g., by automated machinery (forklifts or other vehicles), outside robots (not shown), human interaction, mechanical systems (not shown), and the like. In an embodiment, the existing pallet 3400A/3400B and the new pallet 3400C may be swapped via the robot 3300 (i.e. the robot 3300 uses its arm 3320 and end effector apparatus 3330 to facilitate the swap). In an embodiment, the pallet swap operation may also be determined as required due to the pallet fill status of the existing pallet 3400A/3400B returning a value indicating full. For instance, if the robot 3300 has a camera in-hand (installed on the robot arm 3320), then the robotic system may control the robot arm 3320 to be placed at a location and orientation in which the camera 1200 is pointed at a bottom corner of the existing pallet 3400A/3400B. In yet another embodiment, the pallet swap command may further be determined as required in response to a determination that an existing object type identifier 3700 associated with an existing object 3540/3580/3590 and/or an overflow object 3550/3560/3570 does not correspond with the pallet identifier. In still a further embodiment, the pallet swap operation may further be determined as required in response to a determination that an incoming object type identifier 3700 associated with an incoming object 3510/3520/3530 does not correspond with the pallet identifier.

The robotic system may still further be configured for recording a corresponding object placement pose after placing the corresponding object (aka the target object with a corresponding object type identifier 3700) on the pallet 3400. In an embodiment, the robotic system may be configured for controlling the robot arm 3320 to place the non-corresponding object (aka the target object with a non-corresponding object type identifier 3700) in the buffer zone 3150. The robotic system may still further be configured for recording a non-corresponding object placement pose after placing the non-corresponding object in the buffer zone 3150.

The method 4000 may further include an operation 4009, wherein the robotic system generates updated loading environment image information including a target object placement pose in the loading environment 3100. After one or more objects 3500 have been moved within, into, or out of the loading environment 3100, the loading environment 3100 may be changed and thus may require being reimaged to ensure the computing system 1100 has accurate and current information about the state of the loading environment 3100. Such updating may also be required after a pallet swapping or other pallet transportation operation, as discussed further below. Generating the updated loading environment image information may include controlling the camera 1200 to capture the updated image information. In an embodiment, the computing system 1100 may control the camera 1200 to capture image information representing at least one of the loading areas 3110/3120/3130/3140, and the fill status of the at least one loading area, after execution of operation 4008. This may further include controlling the camera to capture image information representing the fill status of the pallet 3400A/3400B disposed within the at least one loading area 3110/3120/3130/3140 after execution of operation 4008. This may still further include controlling the camera to capture image information representing the target object placement pose within the loading area 3110/3120/3130/3140 (and, in embodiments, the target object placement pose on the pallet 3400A/3400B) after execution of operation 4008. In an embodiment, the computing system 1100 may control the camera 1200 (and or the robot arm 3300 to position the camera 1200) to capture image information representing the buffer zone 3150, and the fill status of the buffer zone 3150 after execution of operation 4008. This may further include controlling the camera 1200 to capture image information representing the target object placement pose within the buffer zone 3150 after execution of operation 4008. The updated loading environment image information may allow for the refinement of future operations 4001-4009 conducted via the robotic system. The robotic system may subsequently process the loading environment image information to perform a new motion planning operation 4006 for retrieval and placement of subsequent objects in the queue into the loading environment, in accordance with operations 4001-4009 of the method 4000.

As discussed above, the method 4000 of the present invention involves the computer system 1100 configured to communicate with and control the robot 3300 having the robot arm 3320 that is attached to or includes the end effector apparatus 3330, and a camera 1200/1200 disposed on the arm 3320/end effector apparatus 3330, or elsewhere within the loading environment 3100 separate from the robot 3300. The robot 3300 may be within the loading environment 3100, and the object queue 3160 provides incoming objects 3510/3520/3530 to the loading environment 3100 for interaction with via the robot 3300. The method 4000 includes the at least one processing circuit 1110 being configured for the performance of at least operations 4001-4009. The performance of method 4000 achieves technical improvements to the robotic system, including but not limited to increases in the speed, efficiency, and precision of retrieval and placement of objects 3500 within the loading environment 3100.

Figure 6:
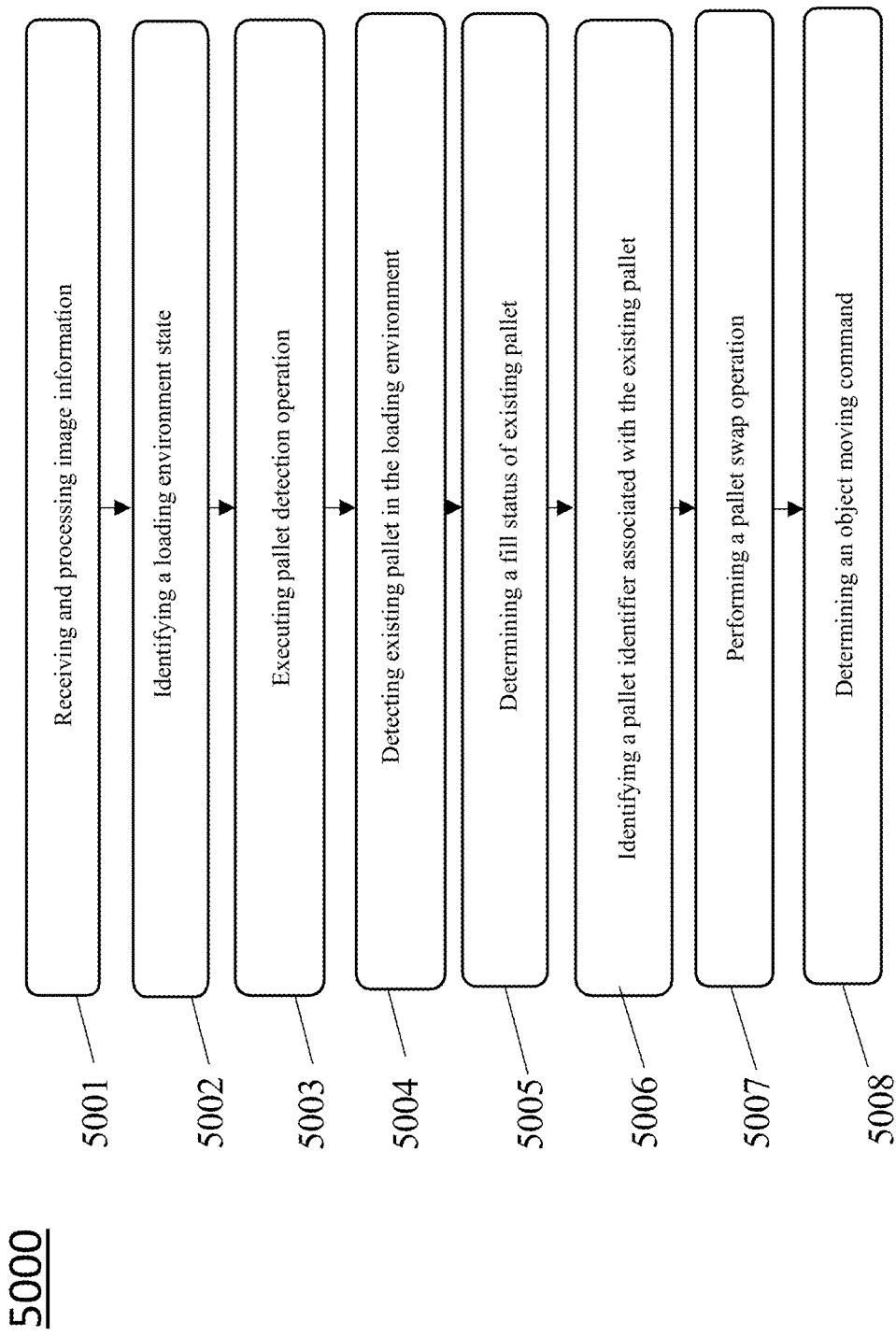
FIG. 6 provides a flow diagram that illustrates a method of planning and placement of objects within a loading environment according to an embodiment hereof.

The present disclosure further relates to performing, facilitating, and/or planning the transfer of a plurality of incoming objects 3510/3520/3530 from the object queue 3160 to pallets in loading areas 3110/3120/3130/3140 and/or buffer zones 3150 available within the loading environment 3100. FIG. 6 depicts a flow diagram for an example pallet management method 5000 for performing, facilitating, and/or planning the transfer of a plurality of objects from a queue or conveyor to pallets and/or buffer zones available within the loading environment.

In an embodiment, the method 5000 may be performed by, e.g., the computing system 1100 of FIGS. 2A-2D or the computing system 1100 of FIGS. 3A-3D, or more specifically by the at least one processing circuit 1110 of the computing system 1100. In some scenarios, the computing system 1100 may perform the method 5000 by executing instructions stored on a non-transitory computer-readable medium (e.g., 1120). For instance, the instructions may cause the computing system 1100 to execute one or more of the modules illustrated in FIG. 2D, which may perform method 5000. For example, in embodiments, steps related to object recognition, e.g. operations 5001-5006, and others, may be performed at least partially via the object recognition module 1121. For example, in embodiments, steps related to motion and trajectory planning, e.g., operation 5007 and 5008, and others, may be performed at least partially via the motion planning module 1129. For example, in embodiments, steps related to object placement and handling, e.g., operation 5008, and others, may be performed at least partially by object manipulation planning module 1126. In embodiments, the loading environment management module 1122 may at least partially perform operations related to loading environment logistics, such as operations 5002 and 5007. In some embodiments, the object recognition module 1121, the motion planning module 1129, the object manipulation planning module 1126, and the loading environment management module 1122 may operate in concert to define and/or plan trajectories that involve both motion and object manipulation.

The operations of the method 5000 may be employed to achieve specific sequential robot trajectories for performing specific tasks. As a general overview, the method 5000 may operate to cause the computing system 1100 to transfer incoming objects 3510/3520/3530 from the object queue 3160 to the corresponding pallet 3400A/3400B disposed within the loading area 3110/3120/3130/3140, or to the buffer zone 3150. Such transfer operations may include operation of the robot 3300 according to a pre-planned trajectory that is updated and/or refined according to various operations occurring during the method 5000. As discussed above, the operations of the method 5000 may performed in conjunction or in combination with any or all of the operations of the method 4000.

The method 5000 may invoke a pallet detection operation (e.g., operation 5004) via the computing system 1100 for confirming the presence of existing pallets 3400A/3400B within the loading environment 3100 (i.e. within a designated loading area 3110/3120/3130/3140). The pallet detection operation may further include, for example, detecting a fill status of existing pallets 3400A/3400B confirmed to be within the loading environment 3100. The pallet detection operation may further include, for example, identifying pallet identifiers associated with the existing pallets 3400A/3400B confirmed to be within the loading environment 3100.

The method 5000 may further include executing a pallet swap operation configured to cause replacement of an existing pallet 3400A/3400B within the loading environment 3100 with a new pallet 3400C from outside of the loading environment. The pallet swap operation may still further include executing a pallet swap to bring in a new pallet 3400C from outside of the loading environment 3100 into the loading environment, and, in an embodiment, into a designated loading area 3110/3120/3130/3140 within the loading environment.

In the method 5000, the computing system 1100 may be configured and operated to cause movement of a robot 3300 to retrieve a target incoming object 3510 (e.g., from among the incoming objects 3510/3520/3530) from an object queue 3160 and to place the target incoming object 3510 onto an existing pallet within a loading environment 3100, for example, according to the various operations of the method 4000. The robotic system may further be configured to plan and adjust for subsequent object retrieval and placement procedures, based on numerous factors related to the target incoming object 3510 and the status of the loading environment 3100. The factors may be determined from image information captured via the camera 1200. The computing system 1100 may be configured to decide to retrieve a target incoming object 3510 from the object queue 3160 and place it onto an existing pallet within a specific loading area 3110/3120/3130/3140 provided within the loading environment 3100. In an embodiment, the computing system 1100 may decide to retrieve a target incoming object 3510 from the object queue 3160 and place it within the buffer zone 3150 within the loading environment 3100. In another embodiment, the computing system 1100 may decide to retrieve a target overflow object 3550 from the buffer zone 3150 and place it onto an existing pallet within a certain loading area 3110/3120/3130/3140 provided within the loading environment 3100. In a further embodiment, the computing system 1100 may determine that a fill status of an existing pallet indicates near- or at-capacity and, in response to such a determination, call for a pallet swap operation to swap the existing pallet with a new pallet located outside of the loading environment. In embodiments, the computing system 1100 may determine that a target object includes an object type identifier 3700 that is non-corresponding to a pallet identifier of an existing pallet 3400A/3400B within the loading environment 3100, and call for a pallet swap operation to swap the existing pallet 3400A/3400B with a new pallet 3400C located outside of the loading environment 3100. In a further embodiment, the robotic system may determine that a pallet 3400 is not present within the loading environment 3100 (or within a specific loading area 3110/3120/3130/3140 of the loading environment 3100), and call for a new pallet 3400C that is dedicated to receive an object 3500 with a corresponding object type identifier 3700 to be brought into the loading environment 3100.

The description of method 5000 refers to Movement Cycle B, illustrated in FIGS. 7A-7D. the movement in these cycles may include movement for the camera 1200 (e.g. camera attached to robotic arm 3320) in front of a loading environment 3100, (or more specifically, an object queue 3160, loading area 3110-3140, and/or buffer zone 3150) so that the camera 1200 can generate image information (e.g., 3d image information 2700 and/or 2d image information 2600) representing the loading environment 3100, wherein the image information is used by the computing system 1100 to determine an operation command to execute or transmit to cause trajectories B1/B2a/B2b/B2c/B3a/B3b/B3c/B4/B5a/B5b to be carried out by available means (e.g. robot 3300, outside robot(s), human interaction, outside computer systems, and/or outside mechanical systems, among other things).

In one type of movement cycle, referred to as Cycle B, depicted in FIGS. 7A-7D, the robot 3300 in the loading environment 3100 may move to retrieve a target incoming object 3510-3530 from the object queue 3160 according to trajectory B1. The computing system 1100 may then determine, based on the processed image information gathered via the camera 1200, whether the target incoming object 3510/3520/3530 to be retrieved from the object queue 3160 possesses an object type identifier 3710/3720/3730 corresponding to an existing pallet 3400A/3400B present within a loading area 3110/3130. The computing system 1100 may then control the robot 3300 to move and place the target incoming object 3510/3520/3530 on the pallet 3400A/3400B (Trajectories B3a and B3b, respectively) if the object type identifier 3710/3720/3730 of the retrieved or target incoming object 3510/3520/3530 corresponds. Optionally, the computing system 1100 may control the robot to move and place the target incoming object 3510/3520/3530 in the buffer zone 3150 (Step B3c as an example) if the object type identifier 3710/3720/3730 of the retrieved or target incoming object 3510/3520/3530 does not correspond to a pallet identifier of any of the existing pallets 3400A/3400B. The computing system 1100 determines where to move and place the object in the buffer zone 3150 based on multiple factors, including the size of the incoming object 3510/3520/3530, the location of overflow objects 3550/3560/3570 already present within the buffer zone 3150, and the orientation of the other objects already present within the buffer zone 3150. The computing system 1100 accounts for these parameters so that future commands configured to move and retrieve the incoming object 3510/3520/3530 from the buffer zone are not hindered by outside factors such as other objects blocking the path of the robot arm 3320 and/or obstructing the view of the incoming object 3510/3520/3530 from the camera 1200 as it gathers image information pertaining to the object (e.g. a larger object 3500 is positioned in front of the incoming object 3510/3520/3530 thus obstructing the cameras view).

In an embodiment, the computing system 1100 may execute a pallet detection operation to determine the presence and identification of a pallet (or pallets) 3400A/3400B in the loading area 3110/3120/3130/3140 within the loading environment 3100. If no pallet is present within the loading environment, the computing system 1100 may transmit a pallet retrieval command configured to cause a new pallet 3400C to be moved into the loading environment within one of the loading areas 3110/3120/3130/3140 (Trajectory B2*c*, for example). New pallet 3400C may be retrieved and moved into the loading environment 3100, e.g., by automated machinery (forklifts or other vehicles), outside robots (not shown), human interaction, mechanical systems (not shown), and the like. In an embodiment, if a pallet identifier of the existing pallet 3400A/3400B does not correspond with the object type identifier 3710-3730 of the target incoming object 3510-3590 retrieved or targeted for retrieval by the robot 3300 to be placed on a pallet 3400, then the computing system 1100 may transmit a command to execute a pallet swap operation. In the pallet swap operation, an existing pallet 3400A/3400B may be removed from the respective loading area 3110/3120/3130/3140 and replaced with a new pallet 3400C (Trajectories B2*a* or B2*b*), where a pallet identifier of the new pallet 3400C corresponds to the object type identifier 3700 of the target incoming object 3510-3590 currently retrieved or being retrieved by the robot 3300.

Movement cycle B is provided by way of example only. The robot 3300 may be controlled to have other movement cycles that involve moving an object 3500 between other repositories functioning as sources or destinations. For example, the robot 3300 may move an existing object 3540/3580/3590 to the object queue 3160 from a loading area 3110/3120/3130/3140, pallet 3400, and/or or buffer zone 3150 within the loading environment 3100. In another example, the robot 3300 may move an existing object 3540/3580/3590 to a buffer zone 3150 from a loading area 3110/3120/3130/3140 and/or pallet 3400 within the loading environment 3100. The robot 3300 may also be controlled or caused to execute other movement cycles that involve moving pallets 3400 within and throughout the loading environment 3100.

The description of movement cycle B should be understood as a description of operations that involve the planning and placement of objects within a loading environment 3100 and/or around a robot 3300. Movement cycles that require different combinations of source and destination repositories/locations may require different combinations and/or different ordering of the operations disclosed herein without departing from the scope of the disclosure.

The steps and methods described with respect to method 5000 are not exclusive of the steps and methods described with respect to method 4000. The systems and devices configured to execute the steps of method 4000 may further be configured to execute the steps of method 5000. The steps of methods 4000 and 5000 may be performed concurrently, successively, and in an overlapping manner within a same loading environment 3100. For example, steps of method 4000 may be performed to transport an incoming object 3510/3520/3530 from the object queue 3160 may be followed by steps of method 5000 to cause rearrangement of pallets 3400 within the loading environment 3100, which may be further followed by additional object placement steps according to method 4000. Thus, any step or operation of the method 4000 may be succeeded by an appropriate step or operation of the method 4000 or the method 5000. Any step or operation of the method 5000 may be succeeded by an appropriate step or operation of the method 4000 or the method 5000.

The computing system 1100 may perform specific steps of method 5000 for transferring the incoming objects 3510/3520/3530 from the queue of objects 3160 into the loading environment 3100 and for further transmitting or executing commands to transform the loading environment 3100 in a manner that increases efficiency of the method 5000's execution. The method 5000 may begin with or otherwise include an operation 5001, in which the robotic system may process loading environment image information gathered as previously described above, to convert the loading environment image information into data that may later be used by the computing system 1100 in the execution of operations 5002-5008, as described in greater detail below. In particular, the loading environment image information may be captured by controlling the camera 1200 disposed on the arm 3320 of the robot 3300, by controlling the secondary camera 1200 provided elsewhere in the loading environment separate from the robot, or by controlling the combination of camera 1200 and secondary camera 1200. In an embodiment, the computing system 1100 may control the camera 1200/1200 to capture image information representing at least one of the loading areas 3110/3120/3130/3140, and the fill status of the at least one loading area. This may further include controlling the camera to capture image information representing the fill status of the pallet 3400A/3400B disposed within the at least one loading area 3110/3120/3130/3140. This may also include controlling the camera to capture image information representing existing objects 3540/3580/3590 within the loading areas (3110/3130 as examples) and on the pallets (3400A/3400B as examples). This may still further include controlling the camera 1200 to capture image information representing the fill status of the pallet 3400C disposed outside the loading environment 3100. In an embodiment, the computing system 1100 may control the camera 1200/1200 to capture image information representing the buffer zone 3150, and the fill status of the buffer zone 3150. This may further include controlling the camera to capture image information representing objects 3550/3560/3570 within the buffer zone. After capture by camera 1200 and/or secondary camera 1200, the loading environment image information may be obtained or received by the computing system 1100 and subsequently processed as previously described. In an embodiment, the computing system 1100 may have been pre-supplied or pre-loaded with information concerning the loading environment 3100, facilitating execution of operation 5001.

The method 5000 may further include an operation 5002, in which the computing system 1100 identifies a loading environment state from the processed loading environment image information. In an embodiment, the loading environment state may include a plurality of object type identifiers 3700 associated with the respective existing objects 3550-3590 existing within loading areas 3110-3140 and/or buffer zone 3150. The loading environment state may further include a plurality of object type identifiers 3700 associated with respective incoming objects 3510/3520/3530 incoming via the object queue 3160. The plurality of object type identifiers 3700 may be received, obtained, or otherwise determined via the image information (e.g., via object recognition, barcode, SKU, or QR code reading, etc.) gathered as previously described above. Optionally or additionally, the object type identifiers 3700 may be pre-supplied or pre-loaded into the computing system 1100. In embodiments, the object type identifiers 3700 may be provided to the robotic system via a separate processor/system. In further embodiments, the object type identifiers 3700 may be received or obtained from a system configured to read wireless identifiers (for example, RFID tags) associated with the objects 3500. The object type may have been determined by the computing system 1100 itself, or by another system in communication with the computing system 1100.

The method 5000 may further include an operation 5003, in which the computing system executes a pallet detection operation. The computing system 1100 is configured to determine the existence or nonexistence of pallets 3400A/3400B within the loading environment 3100 (and more specifically, within loading areas 3110/3120/3130/3140). Upon executing operation 5003, the robotic system may initiate operation 5004, to detect a presence a of an existing pallet 3400A/3400B in the loading environment 3100 (or more specifically in loading areas 3110/3130, respectively) from the loading environment image information. In an embodiment where no existing pallet is detected within the loading environment, the computing system 1100 may further output a pallet retrieval command configured to cause a new or outside pallet 3400C to be brought into the loading environment 3100, and more specifically into a designated loading area 3110/3120/3130/3140 (shown as movement or steps B2a/B2b/B2c in FIG. 7A, for example). In some embodiments, a new pallet 3400C may be retrieved and moved into the loading environment 3100 and the existing pallet (e.g., one of the existing pallets 3400A/3400B) may be transported away from the loading environment 3100, e.g., by automated machinery (forklifts, AGV's, or other vehicles), outside robots (not shown), human interaction, mechanical systems (not shown), and the like. For instance, the existing pallet 3400A/3400B and the new pallet 3400C may be positioned on, and transported to and from one of the loading areas 3110/3120/3130/3140 in the loading environment 3100 via an AGV (not shown). In an embodiment, the computing system 1100 may be configured to cause the robot 3300 to grip and move in the outside new pallet 3400C using the end effector apparatus 3330.

Operation 5003 may further include and initiate operation 5005, in which the computing system 1100 determines a pallet fill status of the existing pallet 3400A/3400B (if one is identified within the loading environment 3100 based on the output of operation 5004; or if a new pallet 3400C is brought into the loading environment 3100 as provided by a pallet retrieval command). In an embodiment, the pallet fill status is determined via the image information captured by the camera 1200. As previously described above, and with reference to FIGS. 2E, 2F and 3A, the computing system 1100 employs the methods related to the object recognition module 1121 that may be performed for image analysis. Spatial structure information (e.g., 3d image information 2700), which may include depth information that describes respective depth value of various locations relative a chosen point may be used in determining the pallet fill status. The depth information may be used to identify existing objects 3540/3580/3590 present on the pallets 3400A/3400B, and/or estimate how the existing objects 3540/3580/3590 are spatially arranged on the pallets 3400A/3400B. In some embodiments, the spatial structure information may include or may be used to generate a point cloud that describes locations of one or more surfaces of the objects existing objects 3540/3580/3590. Spatial structure information is merely one form of possible image analysis (e.g., employing 2d image information 2600) and other forms known by one skilled in the art may be used in accordance with the methods described herein. The spatial structure information may be used in coordinating the placement of objects 3500 onto the pallets 3400A/3400B, so as to prevent improper placement which may cause damage or displacement of the objects 3500 once placed on the pallet.

In an embodiment, the operation 5005 may return a pallet fill status of empty, where the computing system 1100 has analyzed the obtained image information and determined that no objects were present on the pallet 3400A/3400B. In an embodiment, the operation 5005 may return a pallet fill status of occupied, where the computing system 1100 has analyzed the obtained image information and determined that at least one existing object 3540/3580/3590 is present on the pallet 3400A/3400B. The computing system 1100 may further determine the pose of the at least one existing object 3540/3580/3590 identified on the pallet 3400A/3400B. In an embodiment, the operation 5005 may return a pallet fill status of full, where the computing system 1100 analyzed the obtained image information and determined that enough existing objects 3540/3580/3590 are present on the pallet 3400A/3400B such that a subsequent object 3500 cannot practically be placed on the pallet 3400A/3400B due to the final overall weight of the pallet 3400A/3400B (e.g. meets industry weight limitations), lack of empty space/room on the pallet 3400A/3400B, or without risk of damage to the existing objects 3540/3580/3590, the subsequent object, the pallet, or some combination of all.

In an embodiment, the pallet detection operation may—in response to a determination that a pallet fill status returns an output of occupied—cause the computing system 1100 to perform at least one of several subsequent steps. This may include controlling the camera 1200 to generate updated loading environment image information and to transmit or otherwise provide the updated loading environment image information to the computing system 1100 (e.g. according to operation 4009). An object detection and/or obstacle detection procedure may then be performed on the existing pallet 3400A/3400B to generate object/obstacle detection procedure data. Once generated, the object/obstacle detection procedure data may be communicated to the computing system 1100 and may be used in generating or executing an object moving command (described in further detail below) to be subsequently performed. The computing system 1100 may output commands to place subsequent items on the pallet 3400A/3400B in a manner that creates layers of the objects. Once a first layer of objects 3500 is formed on the pallet 3400A/3400B, the computing system 1100 may use a point cloud of the first layer to determine the height of each object 3500 forming the first layer. For example, a height of object 3580 may not be equivalent to a height of object 3590, disposed adjacent to object 3580 (referring to FIG. 3D). The computing system 1100 may then factor in this information for future planning and placement operations used to form a subsequent layer of objects 3500 formed on top of the first layer of objects created on the pallet 3400A/3400B.

In an embodiment where the pallet fill status returns an output of occupied during the pallet detection operation, the computing system 1100 may further perform subsequent steps. These may include controlling the camera 1200 to generate updated loading environment image information. It may further include determining a positional deviation of the existing pallet 3400A/3400B, where the positional deviation data is directed to a pose of the existing objects 3540/3580/3590, or a change in pose of the pallet 3400A/3400B itself. Positional deviation data may be generated in scenarios where the now-existing pallet 3400A/3400B was previously present within the loading environment 3100 (or more specifically within the loading area 3110/3130), but was swapped outside of the loading environment for one of various reasons. That pallet 3400A/3400B had since been brought back into the loading environment, but in a position—or pose—that did not exactly match the position or pose that same pallet was in when it was previously present in the loading environment. For example, an AGV (or other conveyance) that has brought the pallet 3400A/3400B into the loading environment 3100 may have done so in a manner that resulted in the pallet having a degree of rotation (e.g. approximately 90°/180°/270° rotation). The AGV (or other conveyance) may also fail to bring the pallet 3400A/3400B back to the exact lateral coordinate (e.g., X, Y coordinate) it previously was in within the loading environment 3100. As another example, the abrupt movement of the pallet via the AGV (or other conveyance) may have caused the objects on the pallet to shift from their original locations. The positional deviation data may therefore be generated by comparing the old loading environment image information with the updated loading environment image information, and by determining a degree of movement or translation the existing pallet (and in embodiments, the object(s) disposed on top of the existing pallet) provided between the loading environment image information and updated loading environment image information. The computing system 1100 will therefore incorporate this positional deviation data with the object moving command (described in further detail below) to be later performed, in order to make the necessary adjustments when placing the next object. In doing so, the computing system 1100 ensures that multiple objects placed on the existing pallet 3400A/3400B are positioned and oriented in a proper manner, as previously described above in the description of movement cycle B1. This positional deviation data will also be incorporated into properly forming the layers of objects on the pallets, as previously described above.

In a further embodiment, the operation 5005 may return a pallet fill status value of empty. The computing system 1100 may then determine a number of the overflow objects 3550/3560/3570 and/or the incoming objects 3510/3520/3530 that may fit onto the empty existing pallet 3400A/3400B. The outputted object moving command (described in further detail below) may place incoming objects 3510/3520/3530 onto the existing pallet 3400A/3400B accordingly, for example, by forming a first layer with the existing objects 3540/3580/3590 (e.g. objects present within the buffer zone 3150) and/or incoming objects 3510/3520/3530 (e.g. objects provided via the object queue 3160) on the existing pallet 3400A/3400B.

Operation 5003 may further include and initiate operation 5006, in which the computing system 1100 identifies a pallet identifier associated with the existing pallet (if an existing pallet is identified within the loading environment from the output of operation 5004). The computing system 1100 may receive, obtain, or otherwise determine the pallet identifier via the image information gathered as previously described above. Optionally or additionally, the pallet identifier may be pre-supplied or pre-loaded into the computing system 1100. In an embodiment, the pallet identifier may be provided to the computing system 1100 via a separate processor/system. In another embodiment, the object type identifiers 3700 of objects 3500 present on the existing pallet 3400A/3400B may be used to determine the pallet identifier. For example, the object type identifiers 3700 of existing objects 3580/3590 may allow the computing system 1100 to determine that incoming objects 3510/3520/3530 with similar or matching object type identifiers 3700 will correspond with the existing pallet 3400A. In an embodiment, identifying the pallet identifier may include assigning a new pallet identifier to an empty pallet, for example, according to incoming objects 3510/3520/3530 waiting in the object queue 3160. In an embodiment, the computing system 1100 may find that a pallet swap command is required, due to the insufficiency of the existing pallet 3400A/3400B (e.g. the pallet identifier does not correspond to object type identifiers 3710/3720/3730 associated with numerous incoming, overflow, and/or existing objects 3510-3590 that are to be moved). The computing system 1100 may thus, in response to the determination that a pallet swap command is required, send a pallet swap command configured to exchange the existing pallet 3400A/3400B with a new pallet 3400C (shown as trajectory B2*a*/B2*b* in FIG. 7A). In an embodiment, the existing pallet 3400A/3400B and new pallet 3400C may be swapped via outside forces, e.g., by automated machinery (forklifts or other vehicles), outside robots (not shown), human interaction, mechanical systems (not shown), and the like. In a further embodiment, the existing pallet 3400A/3400B and new pallet 3400C may be swapped via the robot 3300 (i.e. the robot 3300 uses its arm 3320 and end effector apparatus 3330 to facilitate the swap).

The method 5000 may further include a pallet swap operation 5007. In the pallet swap operation 5007, the computing system 1100 may determine the necessity of and perform the execution of a pallet swap command. The computing system 1100 may determine whether a pallet swap command is required due to the pallet fill status of the existing pallet 3400A/3400B returning a value indicating full. In an embodiment, the pallet swap command may further be determined as required in response to a determination that an existing object type identifier 3700 associated with an existing object 3540/3580/3590 does not correspond with the pallet identifier. In another embodiment, the pallet swap command may further be determined as required in response to a determination that an object type identifier 3700 associated with an overflow object 3550/3560/3570 does not correspond with the pallet identifier. In an embodiment, the pallet swap command may further be determined as required in response to a determination that an incoming object type identifier 3710/3720/3730 associated with an incoming object 3510/3520/3530 does not correspond with the pallet identifier. In still a further embodiment, the pallet swap command may be determined as required due to the buffer zone having insufficient space (i.e. cannot accommodate more objects), and the target object has an object type identifier 3700 that does not correspond to the existing pallets 3400A/3400B. In embodiments, if the pallet swap command is deemed necessary, the computing system 1100 may cause the pallet swap command to be executed and the pallet swap to occur.

The method 5000 may further include an operation 5008, in which the computing system 1100 determines an object moving command to be performed based on a comparison between the plurality of existing object 3540/3580/3590 type identifiers, the plurality of incoming object 3510/3520/3530 type identifiers, the plurality of overflow object 3550/3560/3570 type identifiers, and the pallet identifier indicating pallet identifier. For example, the object moving command may be performed according to one or more operations of the method 4000. In an embodiment, the object moving command may be executed to cause the robot arm 3320 to retrieve an overflow object 3550/3560/3570 within the buffer zone 3150 and place the overflow object 3550/3560/3570 on an existing pallet 3400A/3400B, responsive to a determination that an object type identifier 3700 of the overflow object 3550/3560/3570 associated with the existing object corresponds with the existing pallet's object type. In an alternative embodiment, the object moving command is executed to cause the robot arm 3320 to retrieve an incoming object 3510/3520/3530 and place the incoming object 3510/3520/3530 on the existing pallet 3400A/3400B responsive to a determination that an object type identifier 3700 associated with the incoming object 3510/3520/3530 corresponds with the pallet identifier. In still a further embodiment, the object moving command is executed to retrieve an incoming object 3510/3520/3530 and place the incoming object within the buffer zone 3150 responsive to a determination that an object type identifier 3700 associated with the incoming object 3510/3520/3530 does not correspond with the pallet identifier.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present disclosure is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

Further embodiments include:

Embodiment 1 is a computing system comprising: a control system configured to communicate with a robot having a robot arm that includes or is attached to an end effector apparatus, and having a camera attached to the robot arm; at least one processing circuit configured, when the robot is in a loading environment and a queue of objects for placement in the loading environment is provided, to perform the following for transferring the objects from the queue of objects into the loading environment: detecting the queue of objects to be provided to the loading environment; receiving a plurality of object type identifiers, each of the plurality of object type identifiers being associated with a respective object of the objects from queue; determining a target object pose of a target object in the queue based on object queue image information received from the camera; determining a target object placement for the target object indicating a planned placement location of the target object in the loading environment; performing a motion planning operation for retrieval and placement of the target object according to the target object pose generated from the object queue image information, and the target object planned placement location; executing a retrieve command for retrieving the target object from the queue according to the motion planning operation; executing a placement command for placing the target object in the loading environment according to the motion planning operation; and generating updated loading environment image information including a target object placement pose in the loading environment.

Embodiment 2 is the system of embodiment 1, further including processing the updated loading environment image information to perform a new motion planning operation for retrieval and placement of subsequent objects in the queue into the loading environment.

Embodiment 3 is the system of embodiment 1 or 2, wherein the at least one processing circuit is further configured for: determining whether the target object is a corresponding object having a corresponding object type identifier or a non-corresponding object having a non-corresponding object type identifier, and wherein the planned placement location is determined as a loading area if the target object is a corresponding object, and the planned placement location is determined as a buffer zone if the target object is a non-corresponding object.

Embodiment 4 is the system of embodiment 3, wherein the at least one processing circuit is further configured for: executing a pallet detection operation by processing the updated loading environment image information to determine a pose of a pallet provided in the loading area; and controlling the robot arm to place the corresponding object on the pallet in the loading area according to the pallet detection operation.

Embodiment 5 is the system of embodiment 4, wherein the at least one processing circuit is further configured for recording a corresponding object placement pose after placing the corresponding object on the pallet.

Embodiment 6 is the system of any of embodiments 3-5, wherein the at least one processing circuit is further configured for: controlling the robot arm to place the non-corresponding object in the buffer zone.

Embodiment 7 is the system of embodiment 6, further including the step of recording a non-corresponding object placement pose after placing the non-corresponding object in the buffer zone.

Embodiment 8 is the system of any of embodiments 1-7, wherein the at least one processing circuit is further configured for: identifying an indicia associated with the target object; assigning the object type identifier to the target object based on the indicia identified; and communicating the object type identifier to the control system.

Embodiment 9 is a computing system comprising: a control system configured to communicate with a robot having a robot arm that includes or is attached to an end effector apparatus, and having a camera attached to the robot arm; at least one processing circuit configured, when the robot is in a loading environment that includes a plurality of loading areas, a buffer zone, existing objects, and a queue of incoming objects, to perform the following: processing loading environment image information received from the camera; identifying a loading environment state from the processed loading environment image information, the loading environment state including a plurality of existing object type identifiers associated with respective existing objects and a plurality of incoming object type identifiers associated with respective incoming objects; executing a pallet detection operation to: detect an existing pallet in the loading environment from the loading environment image information, determine a pallet fill status of the existing pallet, and identify a pallet identifier associated with the existing pallet; and determining an object moving command to be performed based on a comparison between the plurality of existing object type identifiers, the plurality of incoming object type identifiers, and the pallet identifier.

Embodiment 10 is the system of embodiment 9, wherein the object moving command is executed to cause the robot arm to retrieve an existing object and place the existing object on the existing pallet responsive to a determination that an existing object type identifier associated with the existing object corresponds with the pallet identifier.

Embodiment 11 is the system of embodiment 9 or 10, wherein the object moving command is executed to cause the robot arm to retrieve an incoming object and place the incoming object on the existing pallet responsive to a determination that an incoming object type identifier associated with the incoming object corresponds with the pallet identifier.

Embodiment 12 is the system of any of embodiments 9-11, wherein the object moving command is executed to retrieve an incoming object and place the incoming object within the buffer zone responsive to a determination that an incoming object type identifier associated with the incoming object does not correspond with the pallet identifier.

Embodiment 13 is the system of any of embodiments 9-12, wherein the pallet detection operation further includes, responsive to a determination that the pallet fill status is occupied: controlling the camera to generate updated loading environment image information; performing an object detection procedure and/or an obstacle detection procedure on the existing pallet to generate object/obstacle detection procedure data; communicating object/obstacle detection procedure data to the control system; and incorporating the object/obstacle detection procedure data with the object moving command to be performed.

Embodiment 14 is the system of any of embodiments 9-13, wherein the pallet detection operation further includes, responsive to a determination that the pallet fill status is occupied: controlling the camera to generate updated loading environment image information; determining a positional deviation of the existing pallet; and incorporating the positional deviation data with the object moving command to be performed.

Embodiment 15 is the system of any of embodiments 10-14, wherein the pallet detection operation further includes, responsive to a determination that the pallet fill status is empty: determining a number of the existing objects and/or the incoming objects that can fit onto the existing pallet; and outputting the object moving command to form a first layer with the existing objects and/or the incoming objects on the existing pallet.

Embodiment 16 is the system of any of embodiments 9-15, wherein the at least one processing circuit is further configured for: determining if a pallet swap command is required; and responsive to a determination that a pallet swap command is required, sending a pallet swap command configured to cause the existing pallet to be exchanged with a new pallet.

Embodiment 17 is the system of embodiment 16, wherein the pallet swap command is determined to be required when the pallet fill status of the existing pallet is full.

Embodiment 18 is the system of embodiment 16 or 17, wherein the pallet swap command is determined to be required responsive to a determination that an existing object type identifier associated with an existing object does not correspond with the pallet identifier.

Embodiment 19 is the system of any of embodiments 16-18, wherein the pallet swap command is determined to be required responsive to a determination that an incoming object type identifier associated with an incoming object does not correspond with the pallet identifier.

Embodiment 20 is a robotic control method configured to be performed by a control system configured to communicate with a robot having a robot arm that includes or is attached to an end effector apparatus, and having a camera attached to the robot arm when the robot is in a loading environment and a queue of objects for placement in the loading environment is provided, the method comprising: detecting the queue of objects to be provided to the loading environment; receiving a plurality of object type identifiers, each of the plurality of object type identifiers being associated with a respective object of the objects from queue; determining a target object pose of a target object in the queue based on object queue image information received from the camera; determining a target object placement for the target object indicating a planned placement location of the target object in the loading environment; performing a motion planning operation for retrieval and placement of the target object according to the target object pose generated from the object queue image information, and the planned placement location; executing a retrieve command for retrieving the target object from the queue according to the motion planning operation; executing a placement command for placing the target object in the loading environment according to the motion planning operation; and generating updated loading environment image information including a target object placement pose in the loading environment.

Embodiment 21 is a robotic control method configured to be performed by a control system configured to communicate with a robot having a robot arm that includes or is attached to an end effector apparatus, and having a camera attached to the robot arm when the robot is in a loading environment and a queue of objects for placement in the loading environment is provided, the method comprising: processing loading environment image information received from the camera; identifying a loading environment state from the processed loading environment image information, the loading environment state including a plurality of existing object type identifiers associated with respective existing objects and a plurality of incoming object type identifiers associated with respective incoming objects; executing a pallet detection operation to: detect an existing pallet in the loading environment from the loading environment image information, determine a pallet fill status of the existing pallet, and identify a pallet identifier associated with the existing pallet; and determining an object moving command to be performed based on a comparison between the plurality of existing object type identifiers, the plurality of incoming object type identifiers, and the pallet identifier.

The invention claimed is:

1. A computing system comprising:
  a control system configured to communicate with a robot having a robot arm that includes or is attached to an end effector apparatus, and having a camera attached to the robot arm;
  at least one processing circuit configured, when the robot is in a loading environment and a queue of objects for placement in the loading environment is provided, to perform the following for transferring the objects from the queue of objects into the loading environment:
  executing a pallet detection operation after a pallet swap operation to determine a pallet fill status of a pallet at the loading environment;
  detecting the queue of objects to be provided to the loading environment;
  receiving a plurality of object type identifiers, each of the plurality of object type identifiers being associated with a respective object of the queue of objects;

determining a target object pose of a target object in the queue of objects based on object queue image information received from the camera;

determining a target object placement for the target object indicating a planned placement location of the target object in the loading environment;

performing a motion planning operation for retrieval and placement of the target object according to the target object pose generated from the object queue image information, and the planned placement location;

executing a retrieve command for retrieving the target object from the queue according to the motion planning operation;

executing a placement command for placing the target object in the loading environment according to the motion planning operation; and generating updated loading environment image information including a target object placement pose in the loading environment.

2. The computing system of claim 1, further including processing the updated loading environment image information to perform a new motion planning operation for retrieval and placement of subsequent objects in the queue into the loading environment.

3. The computing system of claim 1, wherein the at least one processing circuit is further configured for:

determining whether the target object is a corresponding object having a corresponding object type identifier or a non-corresponding object having a non-corresponding object type identifier, and wherein the planned placement location is determined as a loading area if the target object is a corresponding object, and the planned placement location is determined as a buffer zone if the target object is a non-corresponding object.

4. The computing system of claim 3, wherein the at least one processing circuit is further configured for:

executing the pallet detection operation by processing the updated loading environment image information to determine a pose of a pallet provided in the loading area; and controlling the robot arm to place the corresponding object on the pallet in the loading area according to the pallet detection operation.

5. The computing system of claim 4, wherein the at least one processing circuit is further configured for recording a corresponding object placement pose after placing the corresponding object on the pallet.

6. The computing system of claim 3, wherein the at least one processing circuit is further configured for:

controlling the robot arm to place the non-corresponding object in the buffer zone.

7. The computing system of claim 6, further including recording a non-corresponding object placement pose after placing the non-corresponding object in the buffer zone.

8. The computing system of claim 1, wherein the at least one processing circuit is further configured for:

identifying an indicia associated with the target object;

assigning an object type identifier to the target object based on the indicia identified; and communicating the object type identifier to the control system.

9. A computing system comprising:

a control system configured to communicate with a robot having a robot arm that includes or is attached to an end effector apparatus, and having a camera attached to the robot arm;

at least one processing circuit configured, when the robot is in a loading environment that includes one or more loading areas, a buffer zone, existing objects, and a queue of incoming objects, to perform the following:

processing loading environment image information received from the camera;

identifying a loading environment state from the processed loading environment image information, the loading environment state including a plurality of existing object type identifiers respectively associated with the existing objects and a plurality of incoming object type identifiers associated with respective incoming objects;

executing a pallet detection operation after a pallet swap operation to:

detect an existing pallet in the loading environment from the loading environment image information, determine a pallet fill status of the existing pallet, and identify a pallet identifier associated with the existing pallet; and determining an object moving command to be performed based on a comparison between the plurality of existing object type identifiers, the plurality of incoming object type identifiers, and the pallet identifier.

10. The computing system of claim 9, wherein the object moving command is executed to cause the robot arm to retrieve an existing object or an overflow object and place the existing object or the overflow object on the existing pallet responsive to a determination that an existing object type identifier associated with the existing object or the overflow object corresponds with the pallet identifier.

11. The computing system of claim 9, wherein the object moving command is executed to cause the robot arm to retrieve an incoming object and place the incoming object on the existing pallet responsive to a determination that an incoming object type identifier associated with the incoming object corresponds with the pallet identifier.

12. The computing system of claim 9, wherein the object moving command is executed to retrieve an incoming object and place the incoming object within the buffer zone responsive to a determination that an incoming object type identifier associated with the incoming object does not correspond with the pallet identifier.

13. The computing system of claim 9, wherein the pallet detection operation further includes, responsive to a determination that the pallet fill status is occupied:

controlling the camera to generate updated loading environment image information;

performing an object detection procedure and/or an obstacle detection procedure on the existing pallet to generate object/obstacle detection procedure data;

communicating the object/obstacle detection procedure data to the control system; and incorporating the object/obstacle detection procedure data with the object moving command to be performed.

14. The computing system of claim 9, wherein the pallet detection operation further includes, responsive to a determination that the pallet fill status is occupied:

controlling the camera to generate updated loading environment image information;

determining a positional deviation of the existing pallet; and incorporating the positional deviation with the object moving command to be performed.

15. The computing system according to claim 10, wherein the pallet detection operation further includes, responsive to a determination that the pallet fill status is empty:

determining a number of overflow objects and/or the incoming objects that can fit onto the existing pallet; and outputting the object moving command to form a first layer with the overflow objects and/or the incoming objects on the existing pallet.

16. The computing system of claim 9, wherein the at least one processing circuit is further configured for:

sending a pallet swap command configured to cause the existing pallet to be exchanged with a new pallet when it is determined that the pallet swap command is required.

17. The computing system of claim 16, wherein the pallet swap command is determined to be required when the pallet fill status of the existing pallet is full.

18. The computing system of claim 16, wherein the pallet swap command is determined to be required responsive to a determination that an existing object type identifier associated with an existing object does not correspond with the pallet identifier or an incoming object type identifier associated with an incoming object does not correspond with the pallet identifier.

19. A robotic control method configured to be performed by a control system configured to communicate with a robot having a robot arm that includes or is attached to an end effector apparatus, and having a camera attached to the robot arm when the robot is in a loading environment and a queue of objects for placement in the loading environment is provided, the method comprising:

executing a pallet detection operation after a pallet swap operation to determine a pallet fill status of a pallet at the loading environment;

detecting the queue of objects to be provided to the loading environment;

receiving a plurality of object type identifiers, each of the plurality of object type identifiers being associated with a respective object of the objects from queue;

determining a target object pose of a target object in the queue based on object queue image information received from the camera;

determining a target object placement for the target object indicating a planned placement location of the target object in the loading environment;

performing a motion planning operation for retrieval and placement of the target object according to the target object pose generated from the object queue image information, and the planned placement location;

executing a retrieve command for retrieving the target object from the queue according to the motion planning operation;

executing a placement command for placing the target object in the loading environment according to the motion planning operation; and generating updated loading environment image information including a target object placement pose in the loading environment.

20. A robotic control method configured to be performed by a control system configured to communicate with a robot having a robot arm that includes or is attached to an end effector apparatus, and having a camera attached to the robot arm when the robot is in a loading environment and a queue of objects for placement in the loading environment is provided, the method comprising:

processing loading environment image information received from the camera;

identifying a loading environment state from the processed loading environment image information, the loading environment state including a plurality of existing object type identifiers associated with respective existing objects and a plurality of incoming object type identifiers associated with respective incoming objects;

executing a pallet detection operation after a pallet swap operation to:

detect an existing pallet in the loading environment from the loading environment image information, determine a pallet fill status of the existing pallet, and identify a pallet identifier associated with the existing pallet; and determining an object moving command to be performed based on a comparison between the plurality of existing object type identifiers, the plurality of incoming object type identifiers, and the pallet identifier.

21. The computing system of claim 1, wherein the pallet swap operation is performed by an autonomous vehicle.

* * * * *